(12) United States Patent
Howard

(10) Patent No.: US 6,994,361 B2
(45) Date of Patent: Feb. 7, 2006

(54) STEER WHEEL CONTROL SYSTEM WITH TRIMMABLE ROTARY PLATE

(76) Inventor: Durrell U Howard, 306 Krameria Dr., San Antonio, TX (US) 78213

( * ) Notice: Subject to any disclaimer, the term of this patent is extended or adjusted under 35 U.S.C. 154(b) by 247 days.

(21) Appl. No.: 10/623,151

(22) Filed: Jul. 18, 2003

(65) Prior Publication Data

US 2004/0056443 A1    Mar. 25, 2004

Related U.S. Application Data

(63) Continuation-in-part of application No. PCT/US02/33038, filed on Oct. 15, 2002, which is a continuation-in-part of application No. 09/992,752, filed on Nov. 16, 2001, now Pat. No. 6,530,585.

(51) Int. Cl.
*B62D 7/22* (2006.01)

(52) U.S. Cl. .................. 280/89.11; 74/495; 74/527; 74/531; 280/89.13

(58) Field of Classification Search ............ 280/89.11, 280/89.1, 89.12, 89.13, 89, 90; 74/495, 527, 74/531

See application file for complete search history.

(56) References Cited

U.S. PATENT DOCUMENTS

| | | |
|---|---|---|
| 2,509,570 A | 5/1950 | Lee |
| 2,760,518 A | 8/1956 | Peet |
| 3,075,576 A | 1/1963 | Herbert |
| 3,169,551 A | 2/1965 | Lewis |
| 3,230,975 A | 1/1966 | Mercier |
| 3,318,251 A | 5/1967 | Smith |
| 3,730,307 A | 5/1973 | Mitchell |
| 3,756,367 A | 9/1973 | Mitchell et al. |
| 3,792,721 A | 2/1974 | Zahid |
| 3,857,413 A | 12/1974 | Zahid |
| 3,863,947 A | 2/1975 | Weston |
| 3,870,335 A | 3/1975 | Schultz |
| 3,882,953 A | 5/1975 | Maisch |
| 3,882,954 A | 5/1975 | Inoue |
| 3,887,027 A | 6/1975 | Allison |

(Continued)

FOREIGN PATENT DOCUMENTS

DE     1901588     6/1969

*Primary Examiner*—Eric Culbreth
(74) *Attorney, Agent, or Firm*—Townsend M. Belser, Jr.; Nexsen Pruet Adams Kleemeier, LLC

(57) ABSTRACT

A steering control apparatus centers a vehicle steer wheel movable away from a selected center position and includes a rotary member having a face with centering detents, a piston member having a face arranged opposite to the rotary member face with a centering detent aligned with each rotary member detent when the rotary member is center. Bearing members are resiliently pressed between the rotary and piston members, and each is arranged to be in contact with a seat of each of the aligned detents when the steer wheel is centered and to move out of the seats when the rotary member rotates relative to the piston member in response to steering movements by the vehicle driver. Each of the detents includes opposing ramps sloped up from the seat to a track in the corresponding face, and the ramps and tracks may be formed as grooves having substantially the same radius as the bearing members. The piston member is rotatively connected to a clutch disk remotely releasable from a fixed clutch ring so that the piston member detents can be moved to a different static position to change the selected center position.

29 Claims, 11 Drawing Sheets

U.S. PATENT DOCUMENTS

| | | |
|---|---|---|
| 3,897,846 A | 8/1975 | Inoue |
| 3,958,656 A | 5/1976 | Niemann |
| 3,960,179 A | 6/1976 | Zahid |
| 3,961,646 A | 6/1976 | Schon |
| 4,008,782 A | 2/1977 | Chanal |
| 4,088,154 A | 5/1978 | Patton et al. |
| 4,349,079 A | 9/1982 | Leiber |
| 4,359,123 A | 11/1982 | Haupt et al. |
| 4,410,193 A | 10/1983 | Howard |
| 4,418,931 A | 12/1983 | Howard |
| 4,467,884 A | 8/1984 | Robertson et al. |
| 4,503,678 A | 3/1985 | Wimbush |
| 4,506,507 A | 3/1985 | Wimbush |
| 4,534,577 A | 8/1985 | Howard |
| 4,558,878 A | 12/1985 | Motrenec |
| 4,566,712 A | 1/1986 | Motrenec |
| 4,585,400 A | 4/1986 | Miller |
| 5,527,053 A | 6/1996 | Howard |
| 5,536,028 A | 7/1996 | Howard |
| 6,003,887 A | 12/1999 | Howard |
| 6,422,582 B1 | 7/2002 | Howard |
| 6,520,519 B2 | 2/2003 | Howard |
| 6,520,520 B2 | 2/2003 | Howard |

STEER WHEEL CONTROL SYSTEM WITH TRIMMABLE ROTARY PLATE

RELATED APPLICATIONS

This is a continuation-in-part of prior International Patent Application Serial No. PCT/US02/33038 filed Oct. 15, 2002, which designated the United States and is a continuation-in-part of prior U.S. patent application Ser. No. 09/992,752 filed Nov. 16, 2001, now U.S. Pat. No. 6,530,585 issued Mar. 11, 2003, the entire contents of these applications and this patent being expressly incorporated herein by reference.

FIELD OF THE INVENTION

This invention relates to vehicle steering systems and more particularly to a device for holding the steer wheels of a motor vehicle, such as a motor home, bus, truck, automobile or the like, so that a center steering position is maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway motor vehicles and the like are designed primarily for driver control. In these systems, the steering force required on the steering wheel and the ratio between steering wheel movement and movement of the steered ground wheels (steer wheels) depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

In the past, motor vehicle steering systems have provided some steering wheel returnability by slanting the king pins of the steer wheels so that their top ends are aft of their bottom ends. This is referred to as a positive king pin angle and produces a turning-lift effect that provides some steering wheel returnability as explained further below. The use of positive king pin angles involves compromises over the full steering spectrum because it results in positive caster offset and thereby produces castering of the steer wheels. For example, the adverse effects of strong gusty cross winds are more pronounced with large amounts of positive caster offset. As its name would imply, the vehicle tends to caster towards the side of the roadway to which it is being pushed by the wind. Thus, the adverse steering inputs caused by crosswinds are directly related to the amount of positive king pin angle, which is a classic example of having to balance a benefit with a detriment.

Any small amount of stability gained on a non-windy day from slanting the steer wheel king pins may be paid for many times over when driving in a crosswind because of the destabilizing castering effect of the crosswind. Similarly, a high crown at the center of the roadway or a slanted roadway tends to cause vehicles with castered steer wheels to turn toward the edge of the roadway, that is, in the downhill direction. Castered steer wheels also allow steering inputs from rutted and other imperfect roadway surfaces to steer back against the driver and thereby cause road wander, which is a universal driving complaint, particularly by driver's of heavy vehicles such as trucks and motor homes. In addition, due to increased turning-lift effects, generous positive king pin angles provide significant resistance to small radius turns, which can make city driving quite fatiguing. These adverse effects are some of the negative aspects of attempting to achieve steering system stability through generous amounts of positive king pin angle.

Another drawback of prior art steering systems is that spurious inputs transmitted from the roadway through the steer wheels affect substantially the entire steering assembly before encountering any stabilizing resistance from the steering wheel. The transmission of these inputs between the steer wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

For lack of a more advanced method, slanting of the steer wheel king pin has been accepted by the industry in the past as a low-cost method of achieving steer wheel returnability. Accordingly, many over-the-road vehicles are provided with generous amounts of positive caster offset. Not much thought has been given by others to the self-defeating side effects of steer wheel castering. Keeping a vehicle tracking straight and under control currently requires an inordinate amount of driver steering corrections to counteract the adverse side effects of castered steer wheels. The repetitive task of making numerous precise steering corrections mile after mile weighs heavily on a driver's physical and mental well-being, and may result in extreme driving fatigue. Thus, a highly important consideration that has long been overlooked by the industry is that steer wheel castering is directly responsible for road wander, crowned road steering wheel pull and cross wind steering problems. The failure of the industry to recognize the critical need to provide directional stability by replacing slanting of the king pins with another method of achieving steer wheel returnability may go down in history as one of the longest enduring vehicle design oversights.

My Precision Steer Wheel Control Technology (PSWCT) has brought to light incorrect technical assumptions that have been responsible for this long-standing major vehicle design oversight, which has in effect been responsible for a lack of heavy vehicle directional stability and related highway safety issues. The heavy vehicle industry has made amazing progress in advancing the state of the art in heavy vehicle design with the exception of recognizing the critical need for directional stability. For over a half a century, the driving of heavy vehicles that are lacking in directional stability has required an inordinate amount of corrective driver steering to keep the vehicle going straight and under control. To be directionally stable, a vehicle's steering system must be designed so that the steer wheels track exceptionally straight without requiring repetitive driver steering corrections to keep the vehicle under directional control, thereby greatly reducing the driver work-load. It has been shown that the industry-wide method of slanting the king pins of the steer wheels to achieve steering wheel returnability is the major cause of the unstable behavior of the steer wheels, which results in driver fatigue and a surprising number of other drivability and operational problems.

While this low-cost simple method of achieving steering wheel returnability is desirable from a manufacturing point of view, the resultant operational problems are very undesirable to the consumers, especially to the heavy vehicle drivers who must endure the million upon millions of miles that are many times more fatiguing to drive than they would be in a directionally stable vehicle that is not adversely affected by crosswinds. Historians will find it hard to rationalize how the hundred-year-old method of achieving steering wheel returnability by the "turning-lift effect" could have been used for so long, without steer wheel castering problems being recognized for their negative effect on heavy vehicle drivability. It was not for the lack of consumer complaints about the repetitive steering corrections required to maintain directional control in spite of road wander and steering wheel pull, about crosswind driving fatigue, and about the cost of accelerated steer wheel tire wear.

In fairness to the presently very capable heavy vehicle design community, the industry-wide endorsement of the long standing heavy vehicle steering and control methodology was established before their time, and had been universally accepted throughout the heavy vehicle industry as a cost-effective method of dealing with heavy vehicle steering requirements. Because the consumers' only choice has been to accept the lack of heavy vehicle directional stability and the related drivability problems as normal, other more pressing problems that the consumers were aware of were given priority over advancing the state of the art in heavy vehicle drivability.

Castering and the turning-lift effect may be further explained as follows with reference to FIGS. 1 to 3. In the beginning when the horseless carriage first took to the road, uncomplicated simple technology was of great importance. As a product improvement, the steering tiller initially was traded for a steering wheel that presented a problem because the steering wheel would stay turned after turning a corner. The lack of steering wheel returnability was solved by the simple method of slanting the pivot axis 15 of a steer wheel king pin 12 aft at the top end to accomplish a turning-lift effect created when the steer wheel 13 was turned to the aft side of the slanted king pin, thereby lifting the vehicle by a small amount as illustrated in prior art FIG. 1 by the broken line 14, which shows a turned position of steer wheel 13. When the vehicle driver releases the steering wheel after turning, the weight of the vehicle causes the steer wheel that lifted the vehicle to return toward the lower most on-center driving position represented by the solid line wheel in FIG. 1. Because the steer wheels are connected by a tie rod, both wheels are made to return toward the on-center, straight ahead driving position.

To better understand the turning-lift effect, a graphic example that almost everyone is familiar with is the post of a farm gate that becomes slanted with the passage of time due to the weight of the gate in its closed position. When the gate 10 is opened in either direction, the low end of the gate is lifted by turning it toward a non-slanting side of the post 19 on hinges 11,11, creating a turning lift effect as illustrated in prior art FIG. 2 by the broken line 21, which shows a turned position of gate 10. When the gate is released, its weight will cause it to swing back toward the lower closed position represented by the solid line gate in FIG. 2. On either side near the gate's closed position, the turning-lift effect diminishes and becomes almost neutral such that its weight alone is not able to hold the gate in the fully closed position, requiring a suitable latch mechanism to keep it fully closed. In a similar manner to the turning lift of the farm gate, when the steer wheels of a vehicle return toward their lowermost on-center, straight ahead position, the turning-lift effect also diminishes and does not have enough centering force to keep the steer wheels tracking straight in the on-center driving position. Therefore, the unstable behavior of the steer wheels near the on-center position requires that they be constantly controlled by corrective driver steering input.

The inherent lack of steer wheel directional stability in the on-center driving position is made worse because the same slanted king pin angle that produces the turning-lift effect also produces a steer wheel castering effect that greatly adds to the unstable behavior of the steer wheels during crosswind and crowned road driving conditions. It is amazing that the adverse effect of steer wheel castering has failed to be better understood over the many years because of an original misleading choice of terms. It can be reasoned that in the beginning the shorter term, caster angle, was probably chosen over the more complex term, turning-lift angle, considering that the angles were one and the same. For as long as anyone can remember, the standard reference for the required king pin angle in vehicle specification manuals has always been referred to in degrees of caster angle. Therefore, it is not surprising that it has been mistakenly assumed throughout the industry that steer wheel castering in some manner is beneficial to heavy vehicle drivability, when in fact the opposite is true. Over many years, many of the text books and engineering papers that have been written about heavy vehicle steering geometry have repeated the mistaken assumption that castering the steer wheels makes a contribution to the directional stability of heavy over-the-road vehicles. Unfounded theories attempting to explain how the castered wheel functions to make a vehicle directionally stable, have been repeated in various technical publications, greatly adding to the confusion.

It is also amazing how anyone whose desk chair has castered wheels, which allow the chair to move freely in any direction, could believe in some manner that, when applied to a highway vehicle, castering would keep the steer wheels tracking straight. Referring now to prior art FIG. 3, a castered wheel 24 simply follows the lateral movement of a forward pivot axis 25, which is offset horizontally from a vertical axis 23 defining where the wheel 24 contacts a road surface 16. As applied to a highway vehicle, the pivot axis 15 of the slanted king pin 12 slants to intersect the road surface 16 forward of where the steer wheel 13 contacts the road surface as defined by vertical axis 17, creating what is termed "Caster Offset" as illustrated in FIGS. 1 and 3. A castered steer wheel therefore does not prevent lateral movement of a vehicle, which instead is actually guided by any force acting on the vehicle to cause lateral movement of the offset pivot axis 15. Therefore, during crosswind driving, the castered wheels of a heavy vehicle are guided down-wind by the lateral down-wind movements of the vehicle in response to crosswind gusts, thereby requiring repetitive driver steering corrections to maintain directional control of the vehicle. Crosswind driving is probably the most exhausting driving experience that heavy vehicle drivers must frequently endure because of the repetitive driver steering corrections required to keep the vehicle under control. Crosswind driving is therefore one of the major causes of driving fatigue and related heavy vehicle highway safety issues.

Heavy vehicle steer wheel footprint tests have been conducted using highly accurate instrumentation to measure and record steer wheel activity while driving. During the tests, experienced test drivers made a concerted effort to minimize the corrective steering input to only the amount required to maintain directional control. Any test data that was influenced by inadvertent driver over-steer was not used. Most of the test data was recorded at fifty five (55) miles per hour on a non-windy day on a smooth highway. Therefore, the data is considered to represent a best-case scenario.

According to the test data taken at fifty five (55) miles per hour, the left and right driver steering inputs required to correct the unstable behavior of the steer wheels varied from the on-center position thirty-five to forty thousandths (0.035–0.040) of an inch. When the test driver held the steering wheel steady instead of making the left and right steering corrections required to keep the vehicle directionally under control, the vehicle would make an undesired lane change when the steer wheels were off-center by thirty-five thousandths (0.035) of an inch. When the vehicle speed was increased to sixty-five (65) miles per hour, it only required the steer wheels to be directionally off-center fifteen to eighteen (0.015–0.018) thousandths of an inch to make an undesired lane change. During adverse road and wind conditions, the tests also demonstrated that the unstable steer wheel activity increased substantially, requiring a corresponding increase in driver steering inputs to maintain directional control.

The ideal driving situation is therefore one where the steering system inherently causes the vehicle to travel in an unswerving straight line unless the driver intentionally turns the vehicle in another direction. The ideal steering system should therefore require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steer wheels, and significantly reduces driver fatigue because it results in a major reduction in driver steering inputs. The invention also eliminates the need for positive caster offset by providing directional stability of steer wheels with no positive caster, i.e., a caster angle of zero degrees (0°). Thus, on-center tracking of the steer wheels is achieved by a means that does not have the deficiencies inherent in positive caster offset and that substantially reduces the need for corrective steering inputs from the vehicle driver.

The positive on-center feel of such a directionally stable vehicle provides a new level of driveability for motor vehicles, including automobiles, trucks, buses, campers and motorized homes. The invention thus achieves new levels of directional stability and driveability, which reduce driver fatigue to a level that cannot be achieved by conventional positive caster centering. When a driver turns the steering wheel of modern over-the-road vehicles, power steering does the work. If these vehicles utilize the present invention and the steering wheel is released, the centering control system goes to work and makes the steered wheels track straight with great accuracy by counteracting spurious steering inputs as described below.

The centering assembly section of the centering unit includes a component that moves with the steering system in response to steering wheel movement, and resistance to movement of this component provides a resistance force opposing very small movements (preferably less than 0.001 inch, more preferably less than 0.0005 inch) of the steer wheels to either side of their center position. Small steer wheel movements in the range of 0.015 to 0.040 inch correspond to the very large radius turns that occur when a vehicle is steered through lane change maneuvers at highway speeds (as opposed to the small radius turns that occur when a vehicle turns a corner). Thus, during large radius turns, the resistance unit provides a resistance force that biases the steer wheels back toward their center position, and this bias serves as a return force to return the steer wheels to their center position upon removal of the steering force producing the large radius turn. On the other hand, during small radius turns, the resistance force may be reduced or the resistance unit may be rendered ineffective to permit easy, away from center movements during such turns.

More specifically, the centering assembly includes a pair of cam members with opposing faces, each with at least one centering detent. At least one ball or other bearing member is arranged to simultaneously contact rim bands around undercut portions of two opposing centering detents when a steer wheel or other steerable member is in its selected center position. One of the cam members is dynamic in that it is connected to and moves with the steerable member, and the other cam member is static in that it is adjustably fixed relative to the frame of the vehicle so that the bearing member and the cam members move relative to each other in response to movement of the steerable member away from its selected center position. One or more compressed retaining springs are arranged to press the bearing member between the two opposing cam members so that sufficient contact pressure is maintained at all times to keep the bearing member firmly within the centering detent or in a groove defining a corresponding cam track in the face of each cam member for guiding the bearing member when it is moved outside of the detent.

There are two cam tracks associated with each detent, one extending away in a direction opposite from the other. Each detent includes two sloped ramp segments each with one end adjacent to the centering detent and the other end fared into a corresponding one of the tracks, which may be flat (no slope) for providing substantially zero resistance or may have a more gradually sloped (constant or changing) portion for providing a reduced amount of resistance as described below. The ramp is also formed by a groove and the track and ramp grooves both have substantially the same radius of curvature as the bearing member so as to snugly fit and frictionally engage the bearing member to cause it to travel out of the detent, up the ramp, and along the track when the steering force exceeds a break away level of resistance.

There are preferably a plurality of bearing members and a plurality of opposing of detent and track pairs, one pair being associated with each bearing member. The pressing force between the bearing members and their centering detents resists relative movement between the bearing members and the cam members, and the pressing force provided by the compression spring is preferable supplemented by air pressure in a centering chamber adjacent one of the cam members that is in the form of a cam piston. Because the bearing and cam members are arranged between the steerable member and the frame of the vehicle, resistance to relative movement between these members prevents substantial movement of the steerable member away from its selected center position until the steering force applied to the steering system exceeds a predetermined value corresponding to the level of break away resistance provided by the contact pressure between the bearing members and the centering detents.

The cam members are preferably opposing plates, namely a dynamic rotary plate arranged for rotary movement relative to a static piston plate that is usually restrained from rotation, but is capable of being rotationally adjusted relative to fixed housing components connected to the vehicle frame. The bearing members are preferable a plurality of spherical ball bearings arranged in spaced relation to each other with a disc-like separator retaining this spaced relation. The bearing members may have other rolling shapes with outer bearing surfaces, such as oval bearings and roller bearings. Each cam plate has a plurality of centering detents arranged relative to the bearing members and bearing retainer so that one of the bearings is received in each opposing pair of centering detents when the steering system is centered. The detents or depressions in each cam plate have a spaced relation corresponding to the spaced relation of the bearing members. The bearing members are pressed into the centering detents of the cam plates by means of fluid pressure in a cylindrical centering chamber adjacent the piston plate, which serves as a reciprocating piston, and by one or more retaining springs that keep the plates and bearings in position in the absence of fluid pressure. The contact pressure between the bearing members and the cam plates, and thereby the resistance force, may be varied by varying the fluid pressure in the centering chamber. The pressurized centering fluid is preferably a gas such as air, although liquids would also work.

The invention also includes a feature for eliminating mechanical slack in the interaction between each bearing member and its corresponding centering detent. This slack-removal feature comprises providing each detent with an undercut bottom portion having a radius of curvature that is smaller than the radius of curvature of the bearing member. A narrow contact band may also be provided around the rim of the undercut portion. Although it may be slightly rounded by a convex shape, the width of this band extends generally along a line tangent to the curved surface of the bearing member, such that contact between the bearing member and the centering detent will occur substantially only along a line of contact. Where the transition between the rim of the undercut portion and the adjacent surface of the detent ramp would otherwise be relatively sharp, the contact band along which contact pressure occurs may be slightly convex (rounded) so as to minimize wear at the rim of the undercut portion. If this transition is relatively sharp, repeated travel of the bearing member over the rim may wear off the sharp edge in an uneven manner, resulting in intermittent bands of contact separated by areas of no contact. In each of these alternatives, contact between each bearing member and the rim of the undercut portion of its corresponding detent occurs along substantially a continuous line of contact.

The invention also includes a trim assembly that allows small adjustments to be made in the center position of the steering system to fine tune steering of the vehicle. Such fine tuning makes driving more pleasurable and less fatiguing. The steering control system of the invention thus comprises a centering unit having a center position that is adjustable to permit the center position of the steering system to be changed and reset (trimmed) to compensate for new or changed steering forces which would otherwise cause the vehicle to deviate from its straight ahead course. Changes in the center position of the steering system also may be necessitated by component wear. Even a change of tires may necessitate a change in the center position of the steering system to achieve straight ahead travel of the vehicle. Such "trimming" adjustments may be made remotely to permit the center position maintained by the centering assembly to be fine tuned while the vehicle is in operation from a location near the driver, which is "remote" relative to the location at which the centering unit is connected to the steering system of the vehicle. Therefore, the driver easily trims out steering wheel pull by the simple touch of a trim switch.

The trimming feature is provided by mounting a usually static clutch disk for rotation so that its static position relative to a clutch ring fixed to a frame component may be changed by a trimming device that is actuated from the remote location, such as the driver's station of a vehicle. A preferred trimming assembly for repositioning the clutch disk relative to the clutch ring is a clutch-like mechanism wherein mating conical surfaces on an outer or inner periphery of an annular portion of the clutch disk and on an inner or outer periphery, respectively, of an annular portion of the clutch ring are disengaged from frictional contact, rotated relative to each other and then reengaged into frictional contact. The clutch disk is arranged for rotation on a thrust bearing positioned between the disk and the ring.

In one trim assembly embodiment, the thrust bearing is carried by a push plate that is supported on a plurality of pivotable trim bars arranged to be actuated by a trim piston in a pressurizable trim chamber. To provide the clutch-like mechanism, the clutch disk and the push plate rest against and are moveable axially by pivoting of the trim bars around elbows adjacent to their distal ends in response to axial movement of the trim piston, on which proximate ends of the bars are loosely mounted to permit pivoting thereof. The trim piston functions as a release member and may be driven axially to its release position by fluid pressure, preferably pressurized air, acting against a return spring force, which is preferably provided by the cam plate retaining spring(s) previously mentioned. Such axial movement releases the clutch disk portion from its frictional engagement with the clutch ring portion and permits rotation of both this disk and the piston cam plate within a housing fixed to a frame component. The clutch disk and the piston plate are arranged for axial movement relative to each other, but are locked together for rotation by one or more guide pins, which may be fixed to one of these components and reciprocate in guide bores in the other component.

In another trim assembly embodiment, the thrust bearing is carried by a base member that has an upstanding annular ridge serving as the clutch ring. The base member/clutch ring combination is fixed to a frame component. To provide the clutch-like mechanism, the entire centering assembly is carried by the clutch disk and all of these components, including the centering chamber, are moveable axially by pressurizing the trim chamber of a trim cylinder in which the clutch disk also serves as the trim piston. The clutch disk/trim piston combination functions as a release member and may be driven axially to its release position by fluid pressure, preferably pressurized air, acting against a return spring force. Such axial movement releases the clutch disk portion from its frictional engagement with the clutch ring portion and permits rotation of both this disk and the piston cam plate, as well as the rest of the centering assembly. The return spring force is provided by an arrangement wherein a depending center post carried by the clutch disk passes through a central aperture of the base member, and one or more annular wave type springs positioned around the post are pressed between a push plate threaded on the distal end of the post and an annular type thrust bearing, which is mounted around the post on the underside of the clutch disk.

In this embodiment, the piston cam plate is guided for axial movement relative to the rotary cam plate by a central pin that slidingly engages a bushing of low friction material in a central bore of the piston cam plate, and that is fixed in a bore of the rotary cam plate, although this pin and bore arrangement could be reversed. The piston plate is also guided for axial movement relative to the clutch disk, but these two components are locked together for rotation as a unit by an elongated, generally rectangular lug depending centrally from the piston cam plate and slidingly engaged between a pair of elongated, generally rectangular ears upstanding from the clutch disk.

The upstanding ears form a channel for receiving the depending lug and an elongated jacket having a U-shaped cross section and made of low friction material is preferably inserted in this channel to insure that the lug is held between the ears by a close tolerance sliding fit as needed to prevent any appreciable slack toward either side of the centered bearing members. One advantage of this feature is that, in a manufacturing process, jackets having different thicknesses may be provided for cast lugs and ears that have not been machined to close tolerances, and then a jacket of a specific thickness may be selected to provide the desired close tolerance fit between a particular lug and a particular pair of ears. It is also contemplated that the lug may be upstanding from the clutch disk and that the ears may be depending from the piston cam plate.

In the above embodiments, operation of the trim switch pressurizes the trim chamber and produces axial releasing movement of the clutch disk, which in turn frees the piston cam plate for rotary movement. Alternatively, such releasing movement may be provided by a release member reciprocated by an electric solenoid or other actuating means connected to the release member and acting against a return spring other than the cam plate retaining spring means, such as a separate compression spring means arranged to function in a manner similar to the wave spring return means of the second trim assembly embodiment described above.

Rotary movement of the freed piston cam plate in response to an applied steering force acting through the rotary cam disk and the bearing members permits the steer wheels to move freely to a new center position, at which time the trim switch and the trim chamber pressure are released so that the clutch disk is reengage by the clutch ring, thereby locking the clutch ring and the piston plate in a new static position relative to the vehicle frame. In other words, rotation of the clutch disk to a new static position alters the position of each centering detent relative to the clutch ring and the frame component to which this ring is fixed. Altering the position of the centering detents moves the rest position of the bearing members, the rotary cam plate and the centering shaft around the central axis of the centering shaft, thereby creating a new center position for both the pitman arm or other centering lever and the vehicle steering system connected thereto.

The centering chamber or the trim chamber, or both, may be pressurized by either a gas or a liquid. Thus, one or both of these chambers may be pressurized by hydraulic fluid from the power steering system of the vehicle, or one or both of these chambers may be pressurized by an air brake system of the vehicle. The pressurizing fluid may be provided instead by a hydraulic fluid or gas pressurization system separate from other fluid systems of the vehicle. For example, a pressure accumulator system of the types described in my prior U.S. Pat. Nos. 6,422,582, 6,520,519 and 6,520,520 may be employed for storing and providing hydraulic fluid under pressure to these chambers.

Regardless of the type of fluid pressurization system employed, the system should generate sufficient pressure to return each bearing member to its fully seated rest position in the centering depressions or detents of the cam plates upon cessation of intentional steering inputs. The pressurization system or a retaining spring should also constantly bias the piston cam plate so that each bearing member is maintained in engagement with the cam surface of the cam plates at all times when the centering unit is activated so that there is no slack in the assembly linkages at any time during its operation.

Spurious steering inputs tending to move the tie rod in either direction are therefore resisted by a corresponding resistance force generated by interaction between the cam plates and the ball or other bearing members. Only when intentional steering wheel forces exceed a preselected break away level will the pitman arm shaft of the steering system generate sufficient rotational force on the centering shaft to rotate it about its rotational axis, thereby causing the bearing members to move relative to the cam plates. The centering unit thus includes means for remotely and selectively varying both the amount of resistance to movement away from center and the selected center position of the steer wheels relative to the vehicle frame. Both of these remote adjustments can be made by the driver while the vehicle is in operation.

A driver control panel facilitates making such steering corrections while driving the vehicle. The panel may be conveniently located near the driver and may provide three basic functions, namely, a switch to turn the system on and off, a centering pressure control and gauge, and a momentary trim switch. Activating, adjusting and trimming the centering system is therefore an easy and natural driving function. Should the driver sense a degree of steering wheel pull that becomes a bother, it is then quickly eliminated by pressing the trim switch. A control system may be employed for operating a solenoid and a pressure regulator and the switch and dial for actuating these devices are located on the driver control panel. The switch preferably has a toggle that is biased by a spring to the circuit opening position. These types of switches are closed only momentarily when the toggle is held in a depressed position against the spring bias. Thus, the solenoid is actuated only while the toggle is actually depressed. Release of the toggle opens the circuit and stops the trimming adjustment at the point selected.

The level of resistance to movement away from center may be remotely adjusted either by such a manual control system operable by the driver or by a microprocessor control system responsive to the speed of the vehicle. Thus, the turning resistance of the present invention is readily adjustable to provide a low level at low speeds and a high level at speeds of about 35 mph or greater. In this regard, the centering unit of the present invention is much less complex than prior art arrangements, such as those which combine high positive caster near the center position and complex power steering systems for varying the level of power assist from a low assist level for large radius turns to a high assist level for small radius turns.

The centering return force provided by positive wheel caster follows a force curve that may provide relatively little, if any, turning resistance in the straight ahead position or for large radius turns immediately adjacent to the straight ahead position. The bearings and cam plates are sized and the centering detents are sized and shaped or "cut" so as to provide a resistance force which blends with any return force provided by the normal geometry of the front end of a motor vehicle. The invention can increase substantially the turning resistance available at and immediately adjacent to either side of the straight ahead position of the steer wheels. At greater turning angles (small radius turns), the resistance force provided by the invention preferably tapers off as positive caster return force increases. The turning resistance provided by the invention at or near the centered wheel position should be sufficiently large to resist spurious steering inputs generated either by the driver or by an overactive power steering system.

The level of steering force required to initiate or breakaway into a steering movement away from center is sometimes referred to in this specification as the "break away resistance". Different levels of break away resistance and of resistance force may be appropriate to compensate for changes in the forces acting upon the vehicle. In a preferred embodiment, the shape of the centering detent and other system parameters are chosen so that a total break away steering force of at least 100 pounds, preferably at least 200 pounds, and more preferably at least 300 pounds must be applied to the tie rod in order to initiate break away turning movement of the steer wheels at vehicle speeds above about 35 miles per hour. For city driving at vehicle speeds of about 35 miles per hour or less, the break away force required is preferably lowered to about 100 pounds, more preferably below about 50 pounds, at the tie rod. The centering unit for powered steering systems may be left on continuously because it will automatically turn off with the ignition and come back on when the engine is started. With any malfunction of the vehicle's power steering, an automatic disabling feature may be provided to shut the system completely off.

Where steer wheels are provided with generous positive caster, which is usually the case with highway motor vehicles, the grooves in which the bearing members ride adjacent to the upper end of the ramp of the centering detents may be shaped to form a neutral (no slope) cam surface which provides no further turning resistance or return to center forces. In other words, the interaction between a bearing member and its corresponding detent in the cam member provides a decreasing level of resistance and return forces as the steer wheels move away from center, until the caster return force, which increases in proportion to turning angle with positive caster, is of sufficient magnitude to alone provide stabilizing resistance and return forces. However, the resistance and return forces provided by the invention may not go to zero, especially where there is no or little positive caster, but instead the slope of the track groove surfaces beyond the outer ends of the ramps may provide resistance and return forces effective over the entire range of turning angles, which for highway vehicles is usually limited to 45 degrees on either side of the straight ahead position (the "0" position). Even where there is generous positive caster, substantial resistance and return forces should be provided by the invention for small turning angles away from center, i.e., turning angles in the range from 0 degrees preferably up to at least about 5 degrees, more preferably up to at least about 10 degrees, and most preferably up to at least about 15 degrees, on either side of center, the maximum angle of its effectiveness depending on the positive caster force curve. The resistance and return forces selected at and close to the 0 position should satisfy the on-center feel desired by the driver and be sufficient to overcome anticipated spurious inputs.

The centering unit overrides spurious inputs to the steering assembly of vehicles with positive caster so that constant manipulation of the steering wheel by the driver is no longer required to hold the vehicle on a true straight ahead course. When used on steering systems with no caster or with negative caster, the invention provides the driver with a positive touch control not heretofore attainable with those types of systems. Positive stability is thereby achieved for otherwise marginally stable or previously unstable steering systems. The invention also provides a distinctive feel when approaching or leaving the center position. Thus, the sense of touch is added to the visual sense to aid control of the vehicle and reduce driver fatigue. The turning resistance selected should satisfy the road feel desired by the driver and be sufficient to overcome anticipated spurious inputs.

The centering unit may be connected between the steering system and any nearby frame member of the vehicle serving as a fixed mounting relative to the steering system, although it is preferably mounted on the reduction gear housing and connected to an extension of the shaft carrying the pitman arm. This mounting position allows the steer wheels to move through their full range of steering movements while providing sufficient leverage for the apparatus to resist movement of the steer wheels away from the center position producing straight ahead travel of the vehicle. However, the steering system connection may be made to any steering system component providing appropriate range and leverage.

The invention may be used on steering systems with or without a reduction gear between the steering wheel and the steer wheels. In the former application, the centering unit is preferably connected to the steering system at a location between the steer wheels and the reduction gear, such as to the pitman arm as mentioned above, so as to be unaffected by any slack in the reduction gear or in components and connections between the reduction gear and the steering wheel. It is therefore preferably on the slow side of the reduction gear ratio in order to provide a zero backlash centering unit. The invention is particularly advantageous for large motor vehicles, where its use may reduce tire wear by as much as fifty to seventy percent (50–70%) by preventing oscillations of the steer wheels due to steering system geometry and/or driving conditions.

Although the present invention is particularly useful as a centering unit for motor vehicles, it can be employed to hold the center position of any steerable member moveable to either side of a selected center position. For example, the control system can keep an outboard motor centered so that a boat follows a straight course over the water in the presence of spurious steering forces produced by wind and wave action. The control system can also be used to keep centered such steerable members as the rudders of ships or airplanes and the tongues of tandem trailers or railway cars. The control system is useable with both power and non-powered steering systems, with the level of centering forces provided usually being less for vehicles without power steering.

From the consumers' point of view, the present invention, as well as my prior disclosures of PSWCT, solves a number of heavy vehicle operational problems, and the cost of its installation is more than paid for by the savings in steer wheel tire expense alone because it provides precision steer wheel control that greatly reduces or substantially eliminates excessive steer wheel tire wear. These results are achieved, at least in part, because my PSWCT prevents the steer wheels from castering, thereby alleviating or eliminating the drivability problems that have been caused by steer wheel castering. The system also makes the steer wheels track straight by returning them to and/or holding them in their true centered position, thereby doing away with the unstable behavior of the steer wheels that is inherent to the hundred-year-old farm gate turning-lift technology. Thus, the present invention accomplishes one or more of the following improvements in steer wheel control:

(a) advances the state of the art in heavy vehicle directional stability by keeping the steer wheels tracking straight with a high level of precision, greatly reducing the repetitive driver steering input required to maintain directional control, and thereby doing away with long overlooked steering wheel ergonomics problems and making a major reduction in driving fatigue;

(b) achieves relatively easy vehicle controllability during steer wheel tire blowout, and therefore avoids the need for the usual steering wheel fight;

(c) makes a considerable improvement in crosswind drivability by preventing the steer wheels from downwind caster steering in response to wind gusts, thereby making a major reduction in crosswind driving fatigue;

(d) provides heavy vehicle directional stability that greatly reduces the potential for driver over-steer that can easily start an over-steer chain reaction of the type responsible for many loss-of-control highway accidents, and thereby also makes driver training safer and less costly;

(e) significantly reduces or substantially eliminates road wander that is caused by the unstable behavior of the steer wheels that conventional steering geometry does not control or prevent;

(f) does away with steering wheel pull on crowned or slanted roads that is caused by steer wheel caster steering to the low side of the road;

(g) substantially reduces related heavy vehicle accident potentially by reducing driving fatigue;

(h) makes team driving safer because the driving is easier and less fatiguing to the on-duty driver and the off-duty driver gets more rest and sleep due to the non-swaying, directionally stable ride;

(i) makes trucks pulling multiple trailers much less fatiguing and safer to drive, and also much easier for other vehicles to share the highway with because the trailers stay in line with the non-swaying, directionally stable truck; and, (j) provides a solution to the costly steer wheel tire wear problem that has long been an added expense to heavy vehicle operators.

The invention thus greatly reduces steer wheel tire wear. Tests of my PSWCT suggest improvements in steer wheel tire service life in the range of about fifty-five percent to about seventy percent. Heavy vehicles using this technology have exhibited a smooth, non-cupping steer wheel tire wear pattern instead of the costly irregular wear pattern of the past. Unlike the puzzling steer wheel tire wear problem that has perplexed the heavy vehicle industry for years on end, the explanation of how my PSWCT solves the problem is uncomplicated and easy to understand. First, the costly irregular tire wear pattern only occurs on the front steer wheels due to the unstable behavior inherent in conventional steering geometry. Second, when this unstable behavior of the steer wheels is prevented by my PSWCT, these wheels are made to track in a directionally stable manner with the same precision as the wheels on the nonsteering rear axles. Therefore, the tires have the same smooth wearing tread and the same normal extended service life as those on the fixed non-steering rear axles.

My PSWCT is also represented by a number of my earlier patents, including U.S. Pat. Nos. 4,410,193, 4,418,931, 4,534,577, 5,527,053, 5,536,028, 6,003,887, 6,422,582, 6,520,519, 6,520,520 and 6,530,585, the entire contents of which are expressly incorporated herein by reference. The inventions disclosed in these patents solved many of the shortcomings existing in the prior art. The present invention provides improvements over these earlier patents, especially in the areas of simplicity, precision, reliability, and cost reduction.

BRIEF DESCRIPTION OF THE DRAWINGS

The invention, both as to its structure and operation, may be further understood by reference to the detailed description below taken in conjunction with the accompanying drawings in which.

DETAILED DESCRIPTION OF PREFERRED EMBODIMENTS

Figure 1:
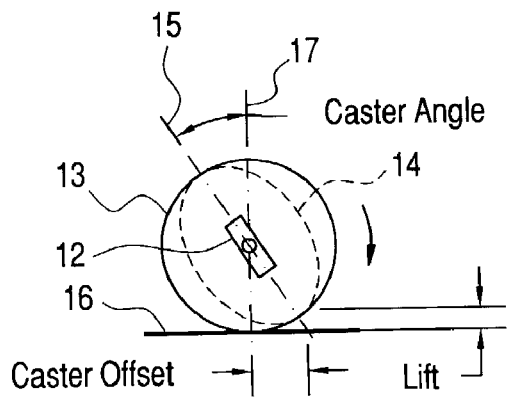
FIG. 1 illustrates a prior art castered steer wheel.
Figure 2:
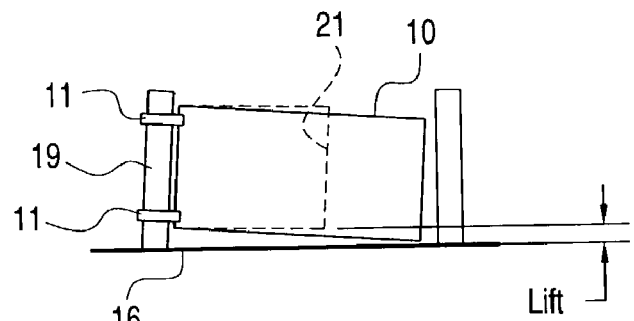
FIG. 2 illustrates a prior art roadway gate hinged on a slanted post.
Figure 3:
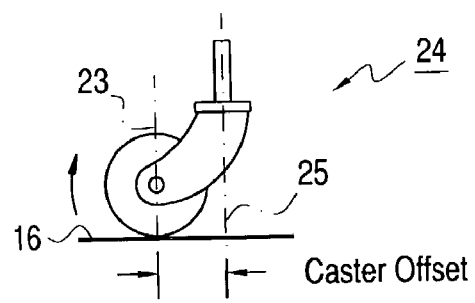
FIG. 3 illustrates a prior art caster wheel.
Figure 4:
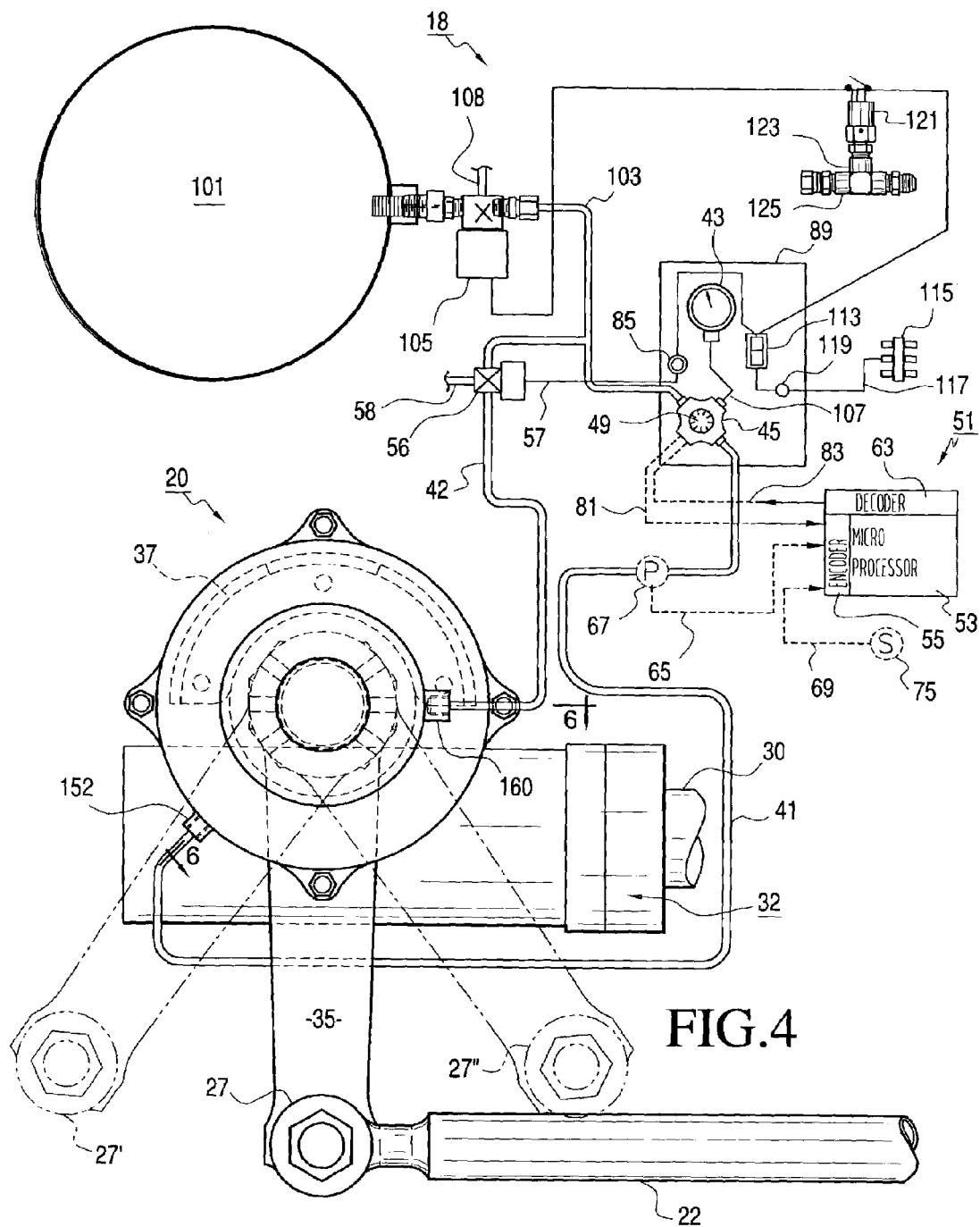
FIG. 4 is a diagrammatic illustration of the fluid and electrical systems of the control unit connected to the centering unit of the invention as shown in elevation and installed as part of the steering linkage of a motor vehicle.
Figure 5:
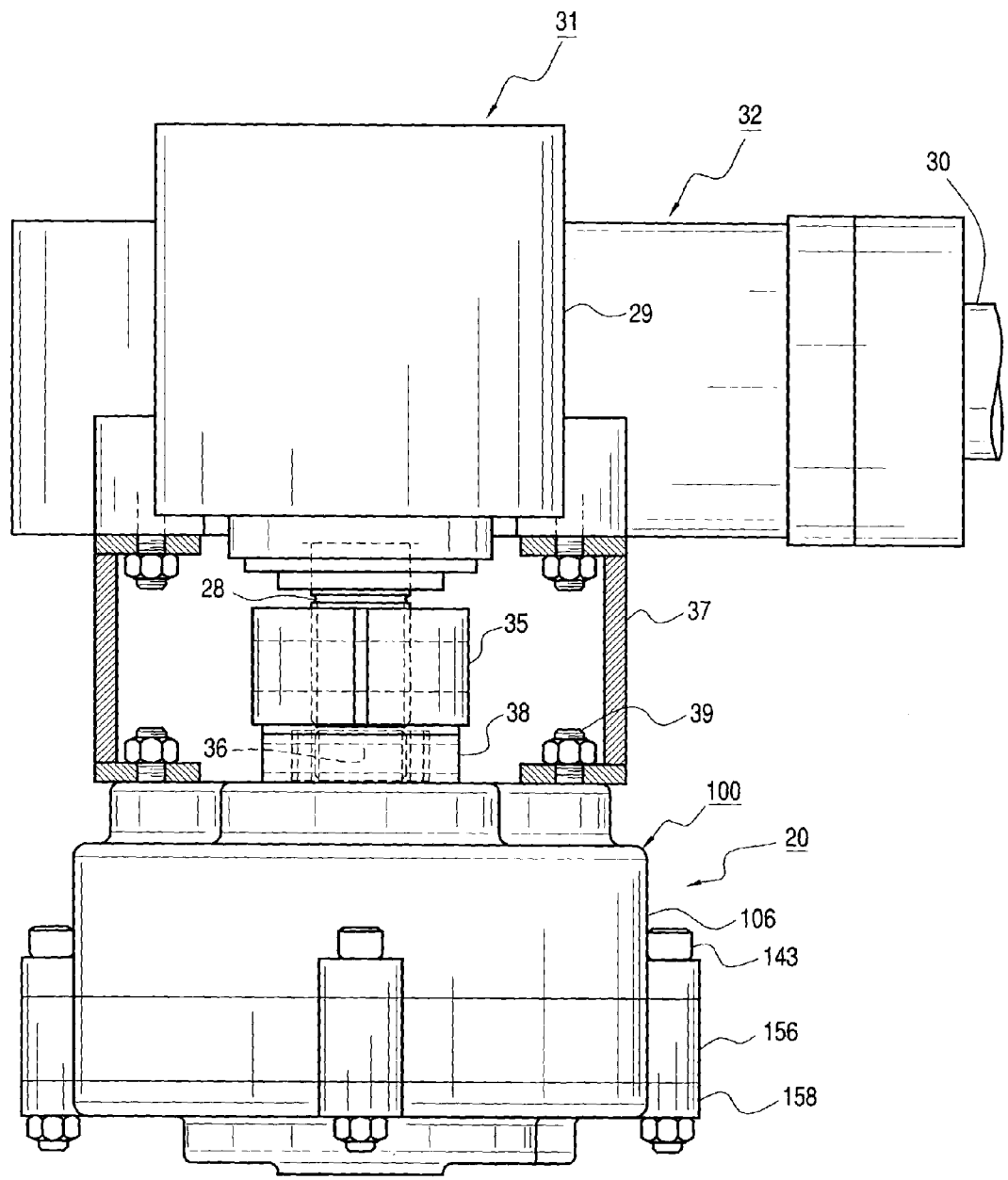
FIG. 5 is an external plan view of the centering unit of FIG. 4 as mounted on a power steering reduction gear by a bracket shown in cross section.

Referring now to FIGS. 4 and 5 of the drawings, the steer wheel control system 18 of the present invention comprises a centering unit, generally designated 20, having a centering shaft 36 connected by a coupling sleeve 38 to a shaft 28 of a reduction steering gear 31. The steering gear 31 is mounted on a power steering unit 32, and the centering unit 20 is mounted on the steering gear housing 29 by a bracket 37 and a plurality of bolts 39. The gear shaft 28 carries a conventional Pitman arm 35, the distal end of which is pivotally connected by an articulated ball joint 27 to a steering rod 22 that in turn is pivotally connected in a similar manner to the tie rod (not shown) of a conventional motor vehicle. Steering inputs by the driver are transmitted to the tie rod via the steering column shaft 30, the power steering unit 32, the steering gear 31, the Pitman arm 35 and the steering rod 22.

The components of the steering control system and the way in which they center and stabilize a vehicle steering system will now be described. It is to be understood that the components described are connected together by appropriately sized fluid conduits and electrical wires and that these conduits and wires are represented by the lines interconnecting the components as shown in FIG. 4. The centering unit 20, through the centering shaft 36 and the lever-like Pitman arm 35 and its connecting linkages, provides a resistance force as described below for resisting movement of the steer wheels (not shown) away from a selectable center position. The level of this resistance force is adjustable and is dependent upon the amount of fluid pressure supplied to a centering chamber 109 (FIG. 6) in the centering unit 20 via a fluid conduit 41 as shown in FIG. 4.

The resistance fluid is preferably a gas and the gas pressure control may comprise a manual throttle valve (not shown) in conduit 41, in combination with a pressure gauge 43 to indicate the gas pressure. Alternatively, a pressure regulator 45 may be used for maintaining a manually selected centering system pressure. A selector knob 49 is provided to permit varying the pressure settings of the regulator by hand. By varying the gas pressure in the gas chamber 109 by adjustments to pressure regulator 45, the break away resistance and the centering return force produced by the centering assembly of the invention can be increased or decreased as desired. The pressure gauge and the regulator may be mounted on a control panel 89, preferably located at or near the driver's station of the vehicle. The range of pressures available should be selected so that break away resistance can be varied from relatively low at low speeds to relatively high at high speeds.

Pressure regulator 45 is connected to a compressed gas source 101 via a conduit 103 containing a solenoid operated three-way valve 105. The gas pressure in chamber 109 is indicated by the pressure gauge 43, which is connected to pressure regulator 45 by a conduit 107. The gas is preferably air. The electrical components of the control system are activated by an on-off switch 113, which is connected to an electrical bus 115 by a line 117 containing a circuit breaker 119. As it is best to deactivate centering unit 20 in the event of a failure of the power steering system, a switch 121 for interrupting electrical power to the solenoid valve 105 may be provided for vehicles with power steering systems. Switch 121 is mounted on a pressure sensor 123 located in a hydraulic line 125 in fluid communication with the outlet of the power steering pump (not shown). A loss of pressure at the pump outlet causes switch 121 to open, thereby causing gas supply valve 105 to close off pressure source 101 and to dump air from line 103 to ambient via exhaust line 108 in the absence of electrical power to its solenoid.

As an alternative to manual adjustment, the output pressure of regulator 45 may be adjusted by a reversible electric motor (not shown) controlled by an on-board computer 51, which comprises a microprocessor 53, an encoder 55 and a decoder 63. Encoder 55 converts to digital signals an analog signal 65 input from a pressure sensor 67 in the gas supply conduit 41, an analog signal 69 input from a vehicle speed sensor 75, and an analog signal 81 input from a position sensor (not shown) within regulator 45. Decoder 63 converts digital control signals generated by microprocessor 53 to an analog signal 83 for controlling the reversible electric motor which adjusts the output pressure provided by regulator 45. The gas pressure in gas chamber 109 and the resulting resistance and centering forces are thereby made automatically responsive to the speed of the vehicle to provide a "speed sensitive" centering force to the vehicle's steering system. It may be desirable in some applications that the resistance to turning movements away from the center position be increased automatically as the speed of the vehicle increases because the effects of small off-center movements in response to spurious steering inputs increase dramatically with vehicle speed.

A trimming assembly section of the centering unit 20, which includes a trim pressure chamber 162 and a trim piston 130 (FIG. 6), is also operated remotely by air pressure provided through a line 42 containing a solenoid valve 56 that is responsive to a driver of the vehicle pushing a trim button 85, which is on the control panel 89 and electrically connected to the valve solenoid by a line 57. Actuation of the solenoid valve 56 to its open position by pushing the button allows an otherwise static cam plate 110 to rotate freely relative to a unit housing 100, thereby permitting a change in the centered position of the Pitman arm 35 as maintained by the centering unit 20, and a corresponding change in the center position of the steer wheels as explained further below.

Figure 6:
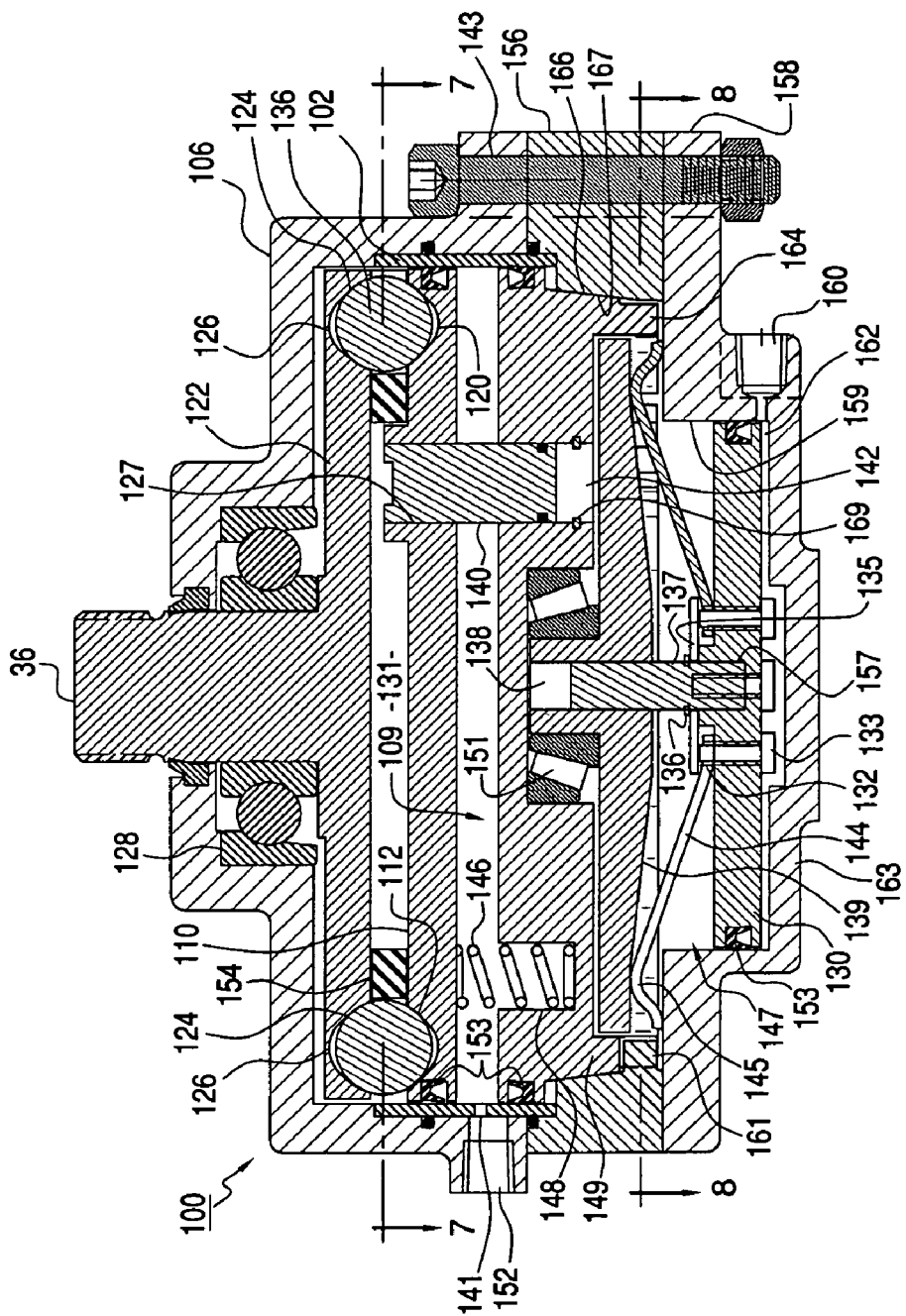
FIG. 6 is a plan cross-sectional view of the centering unit as taken along line 6—6 of FIG. 4 and shows the centering unit in its centered or rest position.
Figure 9:
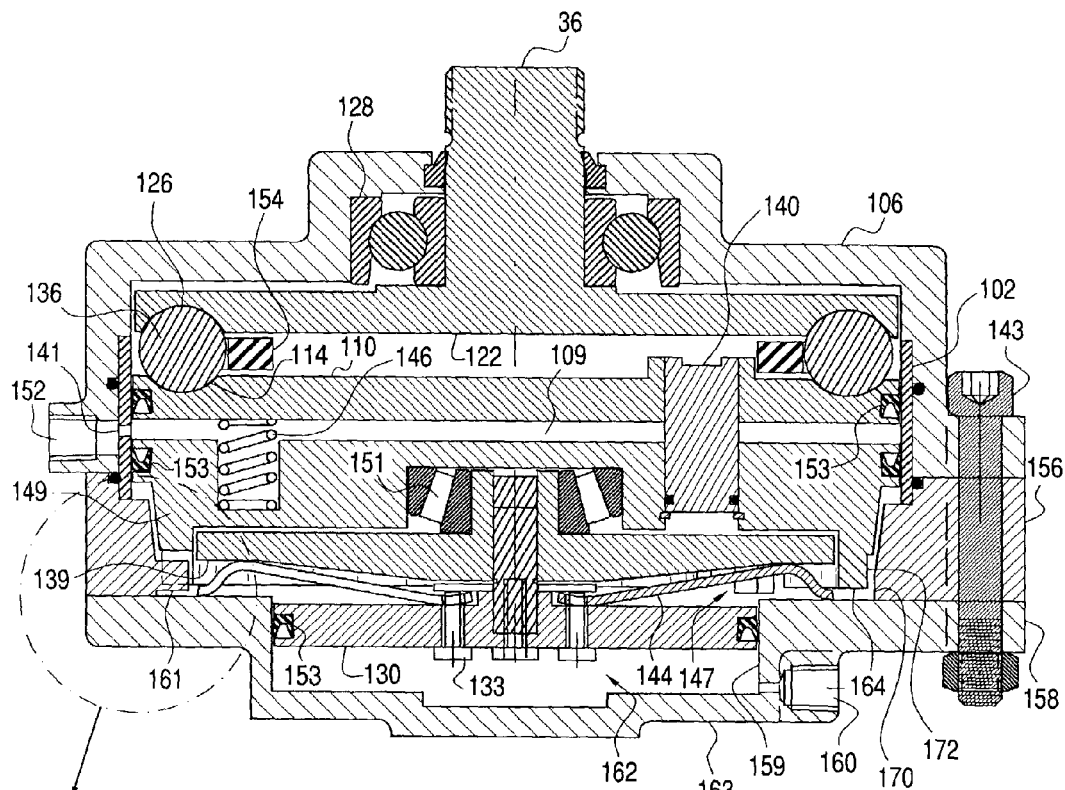
FIG. 9 is a plan cross-sectional view similar to FIG. 6 but showing the centering unit in a moved position relative to the rest position of FIG. 6.

Referring to FIG. 6, the centering unit 20 is shown with both its centering and its trim components in their rest or centered positions. The centering unit housing 100 comprising a cover 106 containing a sleeve forming a centering cylinder 102 held between a clutch ring 156 and the cover 106 by a base 158 and a plurality of bolts 143. Arranged for reciprocal movement within the centering cylinder 102 is a piston cam plate 110 having a plurality of static detents, generally designated 112, each with a pair of adjacent ball tracks 114. As may be seen best in FIG. 7, each detent 112 comprises a ramp 116, a seat band 118, and an undercut bottom 120, the details of which are described further below. Integrally formed with centering shaft 36 at its base is a rotary cam plate 122 mounted for rotation in cover 106 by a thrust bearing 128. Cam plate 122 has a plurality of dynamic detents, generally designated 124, each with a pair of adjacent ball tracks 126 (FIG. 9). The dynamic detents 124 and tracks 126 are substantially identical to the static detents 112 and tracks 114 so that only the details of the static detents and the static tracks will be described hereinafter.

Fixed within bores 127 of cam plate 110 are a plurality of guide pins 140 depending from radially offset positions of piston cam plate 110. Guide pins 140 slidingly engage corresponding bores 142 in a clutch disk 149 during reciprocal movement of cam plate 110 and clutch disk 149 relative to each other. The plate 110 moves in response to movement of a plurality of bearing members, preferably ball bearings 136, out of their corresponding detents in piston plate 110 and rotary plate 122, and the disk 149 moves in response to movement of a trim piston 130 as described below. The piston cam plate 110 is held against rotary movement by means of the pins 140 as long as clutch disk 149 remains in frictional engagement with clutch ring 156. As an alternative arrangement, the guide pins 140 could be fixed in the bores 142 and slidingly engage the bores 127.

Also provided in the unpressurized space 131 between the cam plates 110 and 122 is a bearing member spacer 154 for maintaining the same spacing between the ball bearings 136 as the spacing between the detents 112 and the detents 124 when the ball bearings move away from their seated positions in the detents during rotation of the rotary cam plate 122 in response to turning movements of the vehicle steering system, as transmitted through the lever or Pitman arm shaft 28 and the centering shaft 36.

Between the piston plate 110 and the clutch disk 149 is the pressurizable fluid chamber 109, plate 110 and disk 149 having appropriate fluid seals 153, 153. In addition to intermediate portions of pins 140, centering chamber 109 also contains distal end portions of one or more compression springs 146 positioned in corresponding bores 148 in the clutch disk 149 so that the distal ends of the springs press against the piston plate 110. The compression springs 146 provide enough pressing force against piston plate 110 to hold both it and the bearing members 136 in their proper positions at all times relative to rotary plate 122. Although the spring forces provided by springs 146 in some cases could be sufficient to provide the desired turning resistance represented by the resistance of the ball bearings to movement out of and away from their corresponding detents, the forces of springs 146 are preferably supplemented by providing a pressurized fluid in centering chamber 109 through a fluid port 152 and an aperture 141 in the wall of cylinder 102.

Figure 7:
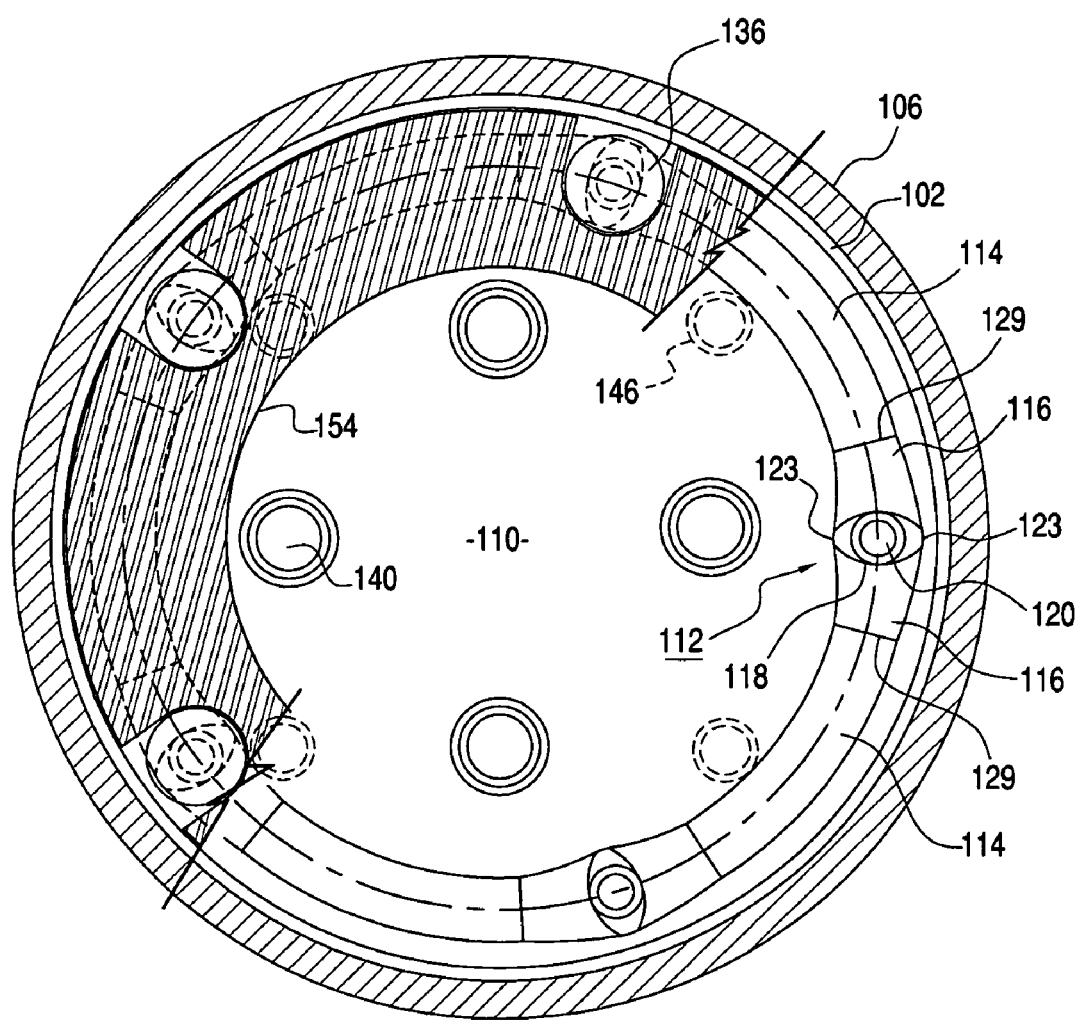
FIG. 7 is an elevational cross-sectional and partially fragmentary view of the centering unit as taken along line 7—7 of FIG. 6.

FIG. 7 illustrates the ball tracks 114 and FIG. 9 illustrates a moved position of the ball bearings 136 along these tracks in response to turning movements of the vehicle that cause corresponding movements of the Pitman arm 35 as illustrated by the phantom lines 27' and 27" in FIG. 4. In FIG. 9, the ball bearings 136 have moved away from the seat bands 118 and past the ends 129 of their respective ramps 116, such that the bearings will thereafter move along the static ball track 114 and the rotated ball track 126 upon further turning movement of the vehicle. As the ball bearings 136 progress up the ramps 116 away from their respective seat bands 118 and past the ramp ends 129, the piston plate 110 and its depending guide pins 140 move from the positions shown in FIG. 6 to the depressed positions shown in FIG. 9, as represented by a snap ring stop 169.

In FIG. 7, there are shown some of the structural details of the detent 112 and the ball track 114 in piston plate 110, which are substantially identical to the details of the detent 124 and the ball track 126 in the rotary plate 122. Both the ramp 116 and the track 114 are formed by a groove cut on substantially the same radius as the radius of the ball member 136 to provide a snug frictional fit between the ball member and the ramp and track. This snug frictional fit ensures that rotation of the rotary plate 122 relative to the piston plate 110 will cause the ball member to smoothly and consistently ride up the ramp 116 and out of the detent onto the ball track 114, even under relatively high compressive loads between plates 110 and 122, such as with fluid pressures in chamber 109 as high as 100 psig.

The movement of the ball bearings 136 out of the detents 112 is driven by rotation of the rotary plate 122 with its ramp in firm frictional engagement with the ball bearings. This firm engagement is provided by forming the ramps of detents 112 and 124 and the tracks 114 and 126 as a groove having substantially the same radius as the ball bearings, which will be explained further below. The breakaway turning force required to initiate ball movement away from the detent seat bands and to maintain ball movement up the ramps of detents 112 and 124 are functions of both the slope of the ramp and the compression force applied to the balls by the fluid pressure in chamber 109. Although ball tracks 114 and 126 may also have some amount of slope to provide continuing resistance through all turning angles, it is preferred in many applications that the tracks 114 and 126 be substantially without slope (flat), such that piston plate 110 does not move further away from rotary plate 122 as the balls travel along these tracks.

As shown in FIGS. 6 and 7, a seat band 118 is provided around the rim of an undercut bottom portion 120 of the detent 112. The width of band 118 is preferably machined to be a flat or slightly convex surface tangent to the curvature of the ball member so that when the ball member is fully seated in the detent, it's outer curved surface rests against the seat band 118 substantially along a line of contact. To ensure such a line of contact and to minimize wear at the upper edge of band 118, the surface of this band may have a slight convex curvature across its width instead of a straight line width. The opposite sidewalls 123, 123 of the detent adjacent to the seat band 118 are cut on a radius that is slightly greater than the radius of the ball 136 to provide a gap (not shown here) between the surface of the ball and the surface of the adjacent sidewalls. This gap insures that the line of contact between the ball and the seat band extends completely around the seat band when the ball is fully seated in the detent 112. The forming of the sidewalls, detents and tracks and the details of their structures are preferably the same as those disclosed in my prior U.S. Pat. No. 6,530,585, which has been incorporated herein by reference.

If the diameter of piston cam member 110 is about 7.0 inches, the air chamber 109 of centering unit 20 may be pressurized by air to a pressure of, for example, about 40 psig to provide a linear resistance force of about 320 pounds as measured at the steering rod 22 for opposing off-center movement of the steer wheels. An air pressure of about 65 psig will provide about the same resistance force with about a 6 inch diameter piston. Since many conventional steering system geometries provide a linear resistance force of about 15 to 20 pounds as measured at the tie rod, the present invention may be used to increase the resistance and re-centering forces of these steering systems by a multiple of about 5 to about 30 or more, preferably about 10 to about 25. A resistance force of 300 pounds or more is particularly effective in eliminating the adverse effects of crosswinds on large vehicles.

The remote trimming feature is provided by mounting the usually static clutch disk 149 for rotation so that its static position relative to the clutch ring 156, which is fixed permanently relative to the vehicle frame as part of the housing 100, may be changed by a trimming device that is actuated from a remote location, such as the driver's station of the vehicle. A preferred trimming device for repositioning the clutch disk within the housing is a clutch-like mechanism wherein mating conical surfaces 166 and 167 on the outer periphery of the clutch disk 149 and on the inner periphery of the cylindrical clutch ring 156, respectively, are disengaged from frictional contact, rotated relative to each other and then reengaged into frictional contact.

To provide the clutch-like mechanism, the clutch disk 149 and a push plate 139 rest against and are moveable axially by actuating means comprising one or more trim bars 144 arranged in a chamber 147 for pivotal movement in a longitudinal plane of the bar and around an elbow 145 adjacent to its distal end in response to axial movement of the trim piston 130. The elbow 145 adjacent the distal end is shaped and arranged to function as a fulcrum for pivotal movement of the proximate end of the bar around this fulcrum by axial movement of the trim piston to which the proximate end is pivotally connected. Although the bars are made of a resilient material, such as steel, they are sufficiently long and stiff to overcome without significant bending the clutch disk and ring engaging forces provided by both the fluid pressure in chamber 109 and the spring force of springs 146.

Rotation of clutch disk 149 is provided by mounting it on a thrust bearing 151 carried by the push plate 139 that is supported on the plurality of pivotable trim bars 144 arranged to be actuated by the trim piston 130 that reciprocates within a cylindrical trim cylinder 159 formed internally within the housing base 158. The trim piston 130 and an opposing portion 163 of base 158 form a trim chamber 162 that is pressurizable by a fluid, preferably air, introduced therein through a port 160 connected to fluid line 42. Fluid line 42 is shown in FIG. 4 as being connected by a line 103 directly to the fluid pressure source 101 so as to receive its full pressure. However, instead of being connected to maximum pressure line 103, line 42 may be connected to variable pressure line 41 for pressuring centering chamber 109. This is because the length of the lever arm of the bars 144 between piston 130 and the bar fulcrum at elbow 145 provides a mechanical advantage sufficient for the pressure in trim chamber 162 to overcome the same pressure in centering chamber 109, as well as the force of springs 146.

Pivotal movement of the bars 144 is facilitated by loosely mounting each of their proximate ends on a corresponding anchor pin 133, the shaft of which has a diameter substantially smaller than the diameter of an aperture 132 in the proximate bar end. The proximate bar ends are held in place on the ends of the anchor pin shafts by a keeper disk 135 that in turn is held in place by a snap ring 136 on an axial guide post 137. The guide post 137 is fixed in a bore 157 in trim piston 130 and slides in a bore guide 138 in push plate 139 to guide both the push plate and the clutch disk 149 as they reciprocate axially in response to the pivoting of the bars 144 by trim piston 130. As an alternative arrangement, the guide post 137 could be fixed in bore 138 and slide in bore 157.

Figure 10:
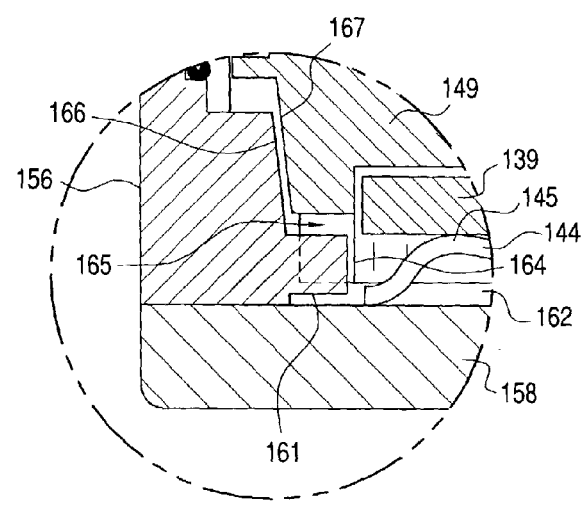
FIG. 10 is an enlarged fragmentary view showing details of the clutch ring face and the opposing clutch disk face within the area identified by the broken line circle 10 in FIG. 9.

The trim piston 130 thereby functions as a release member for the clutch disk 149 and may be driven to its release position by fluid pressure, preferably pressurized air, in trim chamber 162, which acts against a return spring force preferably provided by the cam plate retaining spring(s) 146 previously mentioned. Operation of the trim switch 85 pressurizes the trim chamber 162, which produces axial movement of the clutch disk 149 to its released position shown in FIGS. 9 and 10. Alternatively, a release member other than trim piston 130 may be pivotally connected to trim bars 144 and reciprocated by an electric solenoid or other actuating means, and may act against a return spring means other than the cam plate retaining springs 146.

Figure 8:
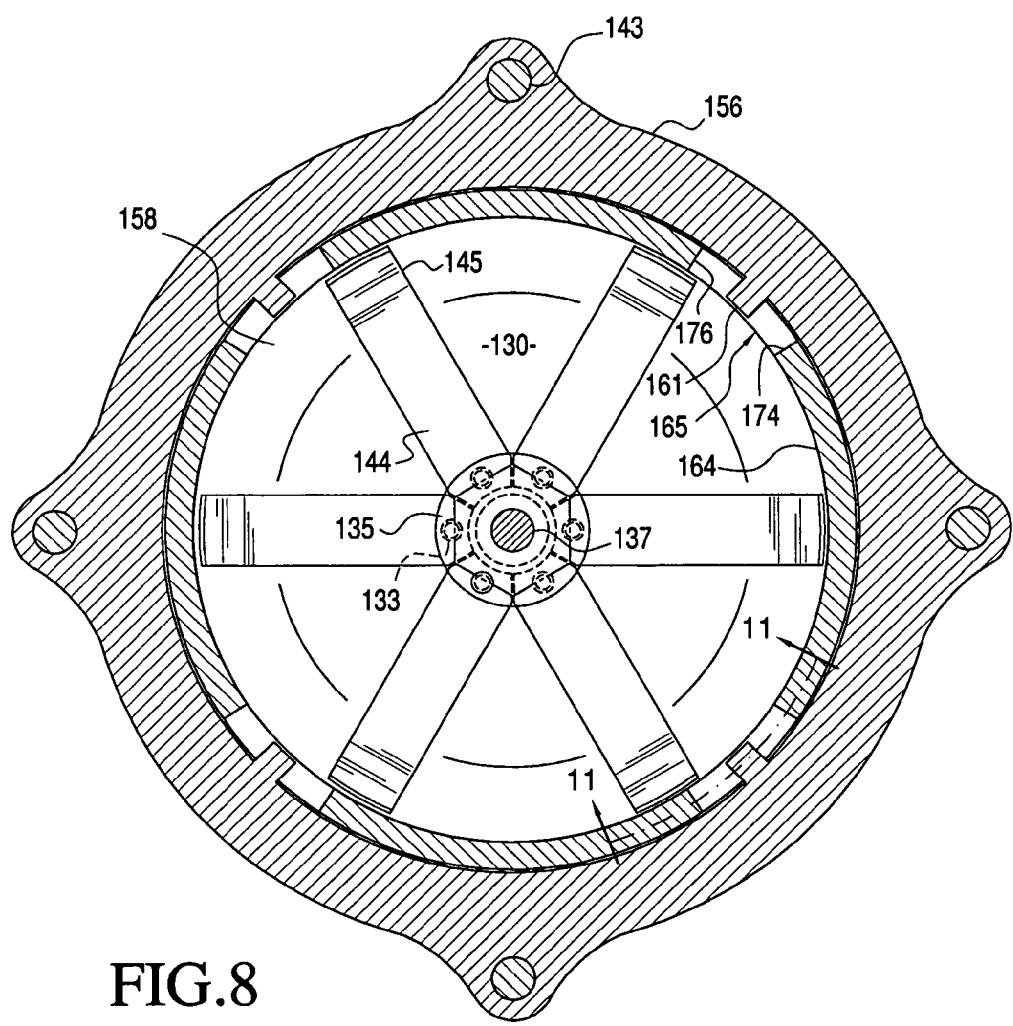
FIG. 8 is an elevational cross-sectional view of the centering unit as taken along line 8—8 of FIG. 6.
Figure 11:
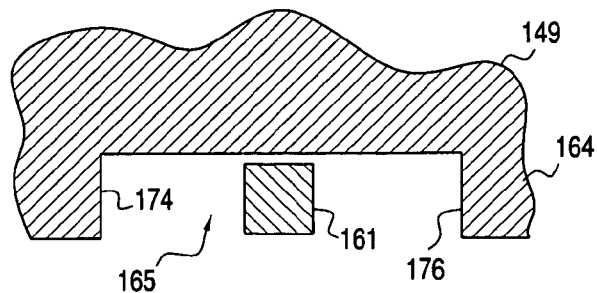
FIG. 11 is an enlarged fragmentary cross-sectional view taken along line 11—11 of FIG. 8 and showing details of a clutch disk stop feature with the centering unit in its rest position.

Such axial movement of trim piston 130 or other release member releases the clutch disk 149 from its frictional engagement with the clutch ring portion 156 of the housing 100 and permits rotation within the housing of both disk 149 and the otherwise static piston cam plate 110. The disk 149 and the plate 110 are arranged for axial movement relative to each other, but are locked together for rotation by the guide pins 140, which may be fixed to either one of these components and reciprocate in guide bores in the other component. The axial movement of clutch disk 149 toward cam plate 110 is preferably limited by the moveable end of pin 140 abutting against the snap ring 169. Rotary movement of the clutch disk 149 is preferably limited by an annular ridge 164 depending from the disk concentric to its axis and having a plurality of gaps 165 into which corresponding bosses 161 project radially from clutch ring 156 as shown best in FIGS. 8, 10 and 11. The opposite edges 174 and 176 of each gap 165 function as opposing stops, which limit rotation of the clutch disk in either direction when engaged by the corresponding boss 161. The outer surface 172 of ridge 164 and an opposing portion 170 of the inner clutch ring surface are spaced radially apart and are cylindrical instead of conical to insure that ridge 164 does not interfere with reciprocation of clutch disk 149.

Rotary movement of the freed piston cam plate 110, in response to an applied steering force acting through the centering shaft 36, rotary cam disk 122 and the bearing members 136, permits the steer wheels to move freely to a new center position, at which time the momentarily pushed trim switch 85 is released, thereby releasing the pressurizing fluid from trim chamber 162 via line 42, three-way solenoid valve 56 and dump line 58. Upon release of this chamber pressure, the spring force of compressed springs 146 return trim piston 130 to its retracted rest position so that the clutch disk 149 is frictionally reengage by the clutch ring 156, thereby locking the clutch ring and the piston plate 110 in a new static position within the housing 100. In other words, rotation of the clutch disk 149 to a new static position alters the rest or centering position of each of the centering detents 112 and 124 relative to the clutch ring 156 and other portions of the housing 100 that are in a permanently fixed position on the vehicle frame. Altering the position of the centering detents moves the rest position of the corresponding bearing members 136 and the centering shaft 36 around the central axis of the housing, thereby creating a new center position for both the pitman arm 35 and any other centering lever or linkage arranged to move with the steering gear shaft 28 and the vehicle steering system connected thereto.

Figure 12:
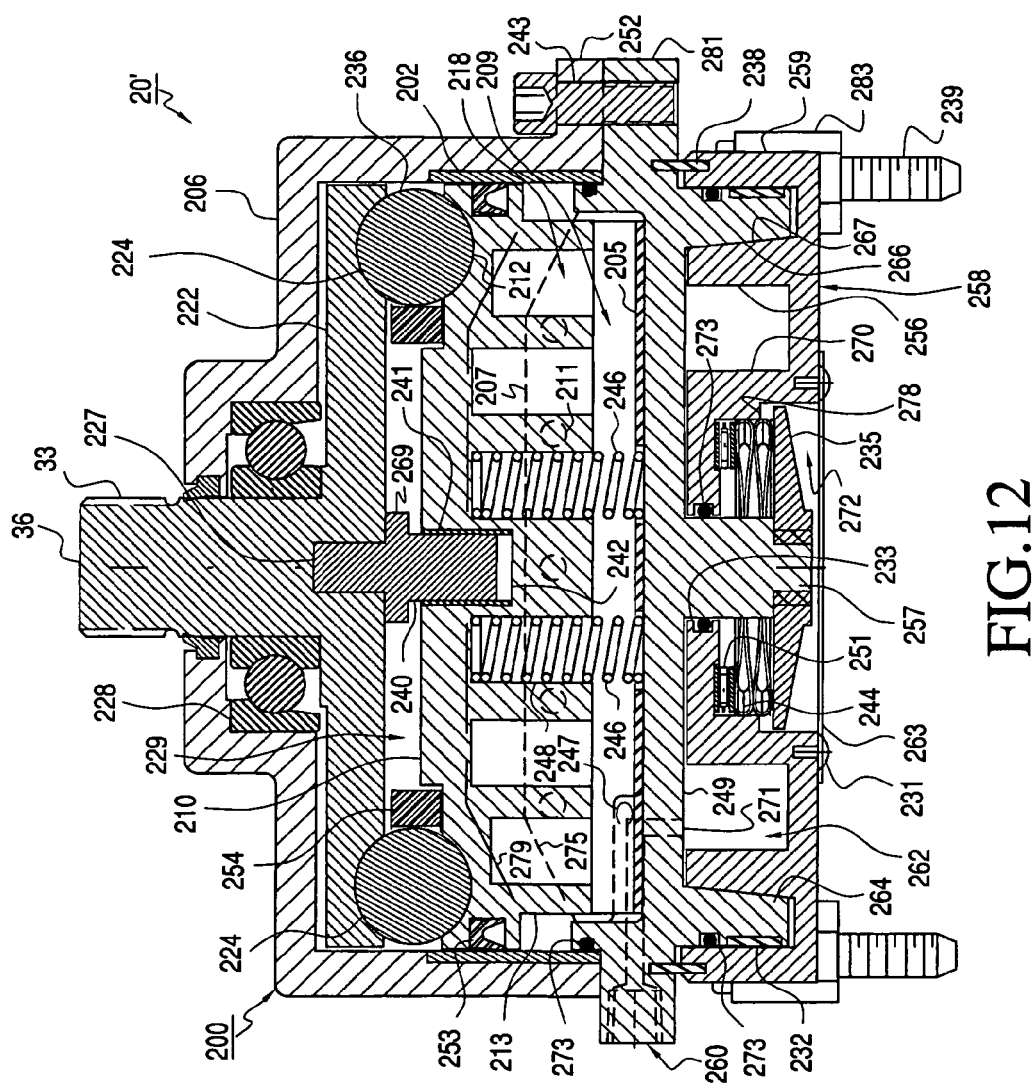
FIG. 12 is a plan cross-sectional view similar to FIG. 6 of a modified centering unit of the invention and shows the modified centering unit in its centered or rest position.
Figure 13:
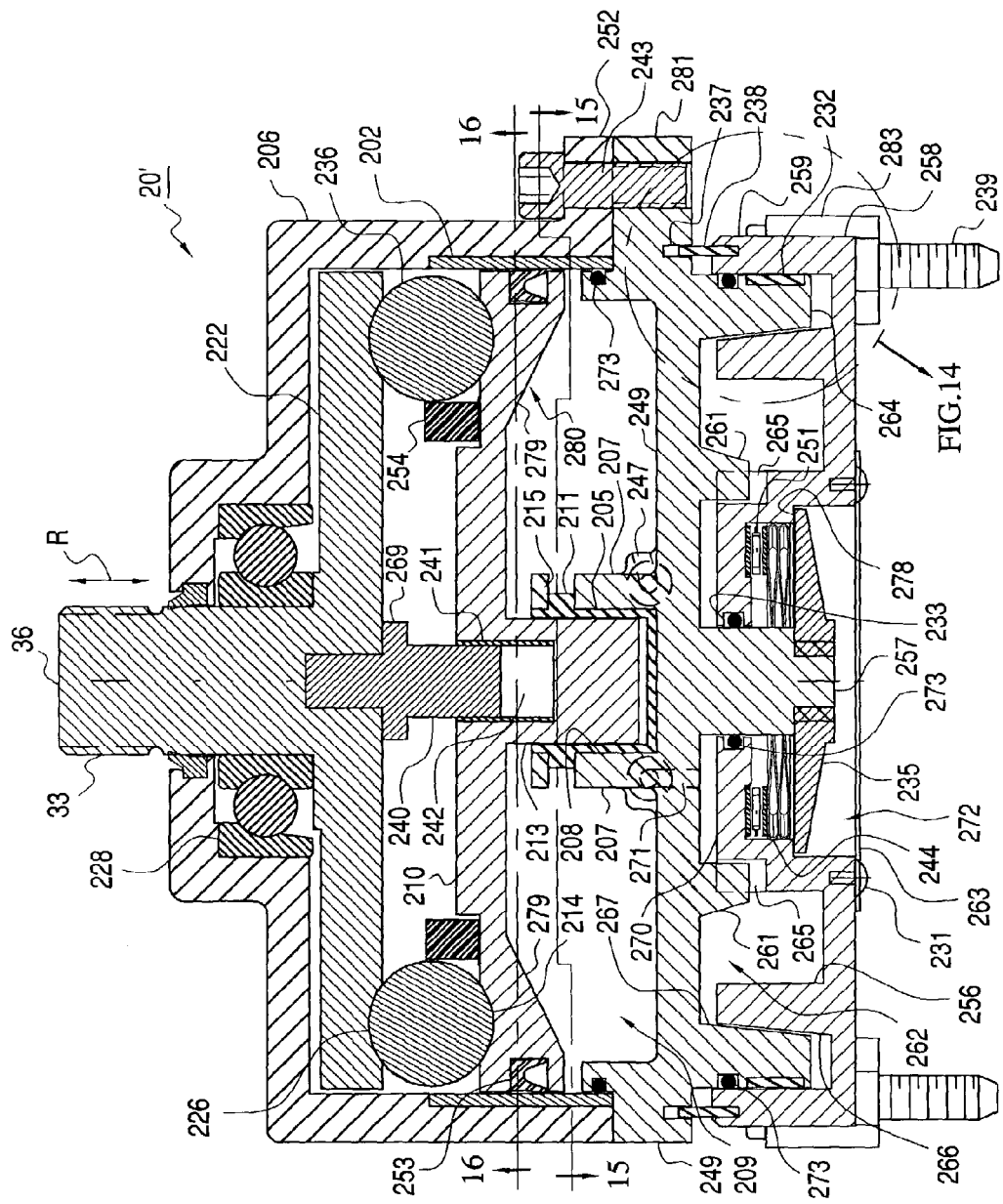
FIG. 13 is a plan cross-sectional view similar to FIG. 12 but showing the modified centering unit in a moved position relative to the rest position of FIG. 12.

Referring now to FIGS. 12 and 13, a modified centering unit 20' is shown with both its centering components and its trim components in their rest positions and in their moved positions, respectively. A centering unit casing 200 comprises a cover 206 containing a sleeve 202 forming a centering cylinder and held between a clutch disk 249 and the cover 206 by a plurality of bolts 243 that secure a plurality of cover lugs 252 to a plurality of disk lugs 281. Thus, in this embodiment, the clutch disk 249 forms part of the casing 200, which is usually static but is adjustable along with the disk 249 by a trimming movement to another static position relative to an annular clutch ring component 256 integral with a fixed base member 258.

Arranged for reciprocal movement within the centering cylinder 202 is a piston cam plate 210 having a plurality of static detents, generally designated 212, each with a pair of adjacent ball tracks 214. Integrally formed with centering shaft 36 at its distal end is a rotary cam plate 222 mounted for rotation within casing 200 by a thrust bearing 228 in cover 206. Cam plate 222 has a plurality of dynamic detents, generally designated 224, each with a pair of adjacent ball tracks 226 (FIG. 13). The static detents 212 and static tracks 214 and the dynamic detents 224 and dynamic tracks 226 are preferably identical to the static detents 112 and tracks 114, which are described above with reference to FIG. 7.

Fixed within a central bore 227 of rotary cam plate 222 is a central guide pin 240 having an annular seating ledge 269. Guide pin 240 depends from cam plate 222 and extends along its rotational axis. Guide pin 240 slidingly engages a sleeve 241 of low friction material in a corresponding bore 242 in piston cam plate 210 to guide this plate during its reciprocal axial movement relative to rotary cam plate 222 as the ball members 236 travel out of and into the respective detents 212 and 224. Of course, this central pin and bore arrangement could be reversed. Also provided in the unpressurized space 229 between the cam plates 210 and 222 is a bearing member spacer 254 for maintaining the same spacing between the ball bearings 236 as the spacing between the detents 212 and the detents 224 when the ball bearings move away from their seated positions in the detents during rotation of the rotary cam plate 222 in response to turning movements of the vehicle steering system, as transmitted through the lever or Pitman arm 35, its shaft 28 and centering shaft 36.

Figure 15:
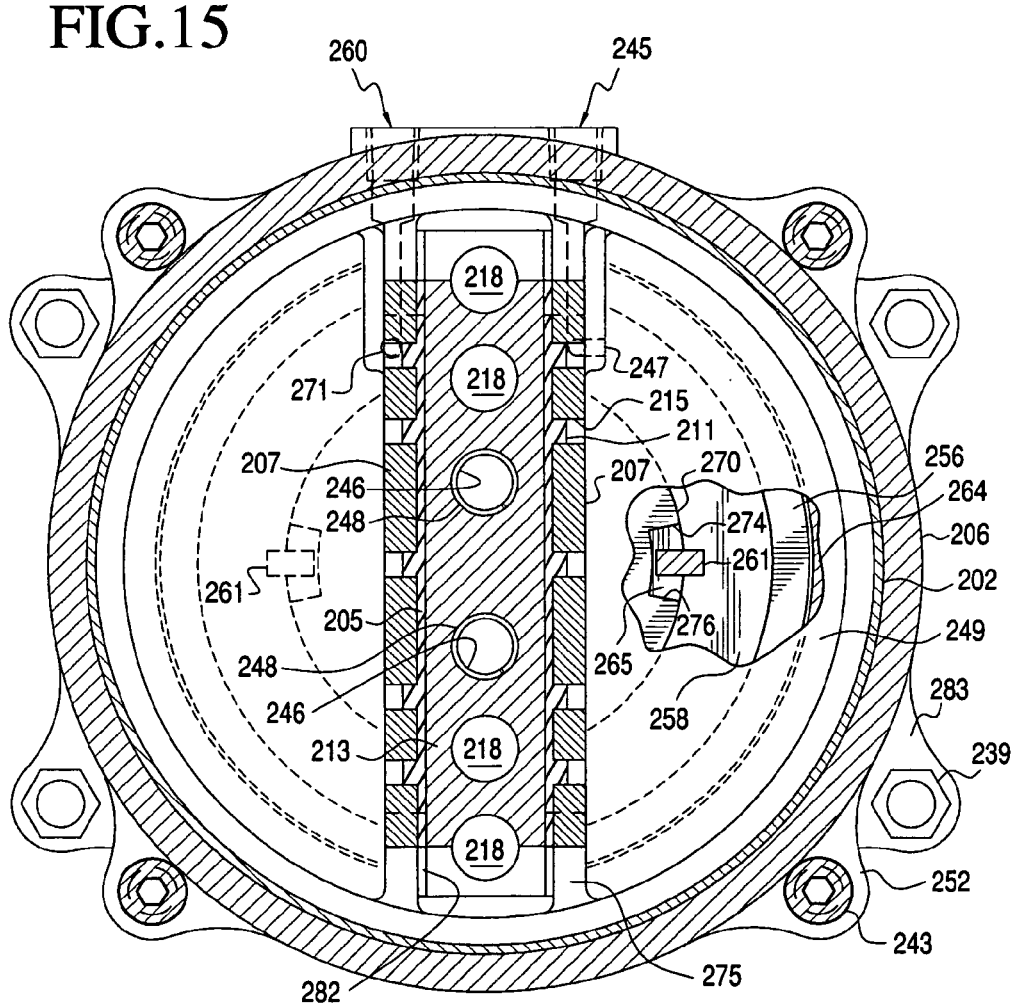
FIG. 15 is an elevational cross-sectional and partially fragmentary view of the modified centering unit as taken along line 15—15 of FIG. 13; and, FIG. 16 is an elevational cross-sectional view of the modified centering unit as taken along line 16—16 of FIG. 13.
Figure 16:
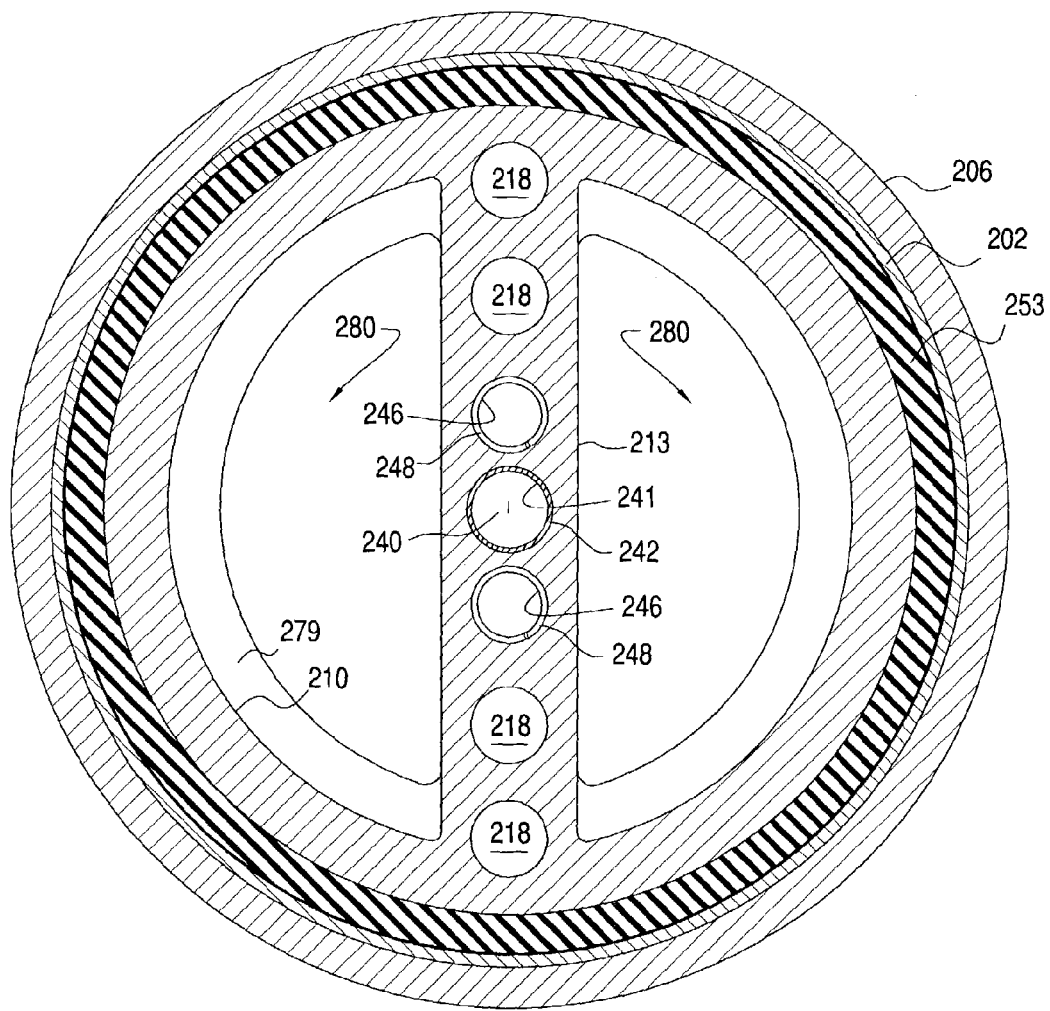

The piston cam plate 210 is guided for axial movement relative to the clutch disk 249, and these two components are locked together for rotation as a unit, by an elongated, generally rectangular lug 213 depending from and extending across the diameter of the piston cam plate. Lug 213 is arranged to reciprocate between a pair of elongated, generally rectangular ears 207, 207 upstanding from the clutch disk 249. The reverse of this structure is also contemplated wherein the lug may be upstanding from the clutch disk and the ears may be depending from the piston cam plate. In order to reduce the mass and weight of the plate 210 and its integral lug 213, the underside of this plate has radially sloped arcuate surfaces 279 forming a hollow 280 on each side of this lug as can be seen in FIGS. 13 and 16, and the lug itself contains a plurality of empty bores 218, as can be seen in FIGS. 12, 15 and 16. The empty bores 218 and the spring bores 248 all form part of a centering chamber 209.

The upstanding ears 207, 207 form a channel 208 for receiving the depending lug 213 and an elongated jacket 205 having a U-shaped cross section. The jacket 205 is made of a low friction, resilient material and is preferably inserted in channel 208 to insure that the lug slides between the ears with a close tolerance sliding fit as needed to prevent any appreciable slack toward either side of the centered bearing members. Jacket 205 is locked into position between the ears 207, 207 by a plurality of knobs or bosses 211 that project laterally outward from each jacket leg and snap into a plurality of corresponding apertures 215 in each of the ears near their distal edges as can be seen best in FIGS. 13 and 15. This snapping action fully seats the jacket 205 in the channel 208 and is facilitated by making the jacket of a resilient material so that the legs of its U-shape bend inward without deforming and then snap outward as the sleeve is pressed into the channel and the bosses 211 enter into the apertures 215. One advantage of this feature is that, in a manufacturing process, jackets having different thicknesses may be provided for cast lugs and ears that have not been machined to close tolerances, and then a jacket of a specific thickness may be selected to provide the desired close tolerance fit between a particular lug and a particular pair of ears.

Between the piston cam plate 210 and the clutch disk 249 is the fluid pressurizable centering chamber 209, and plate 210 and disk 249 are provided with appropriate annular fluid seals 253 and 273, respectively. In addition to the depending lug 213 and the upstanding ears 207, 207, centering chamber 209 also contains distal end portions of one or more compression springs 246 positioned in corresponding bores 248 in depending lug 213 so that the proximate ends of the springs press against the underside of piston cam plate 210. The compression springs 246 provide enough pressing force against piston plate 210 to hold both it and the bearing members 236 in their proper positions at all times relative to rotary plate 222.

Although the spring forces provided by springs 246 in some cases could be sufficient to provide the desired turning resistance represented by the resistance of the ball bearings to movement out of and away from their corresponding detents, the forces of springs 246 are preferably supplemented by providing a pressurized fluid in the centering chamber 209 through a fluid port 245 and a passage 247 in clutch disk 249. Port 245 is preferably connected to the variable pressure air line 41 of FIG. 4. However, as is the case with the first embodiment, the same fluid pressure, either gas or liquid, may be provided in both the centering chamber and the trim chamber. In the second embodiment, the fluid pressure required for the trimming action depends on the return force of the wave springs 244 and the mass of the casing 200 and its contents, and is entirely independent of the fluid pressure in centering chamber 209 within casing 200.

The structural details of the detents 212 and 224 and of the ball tracks 214 and 226 are preferably identical to the details of the detents 112 and of the ball tracks 114, respectively, in the piston cam plate 110 as shown in FIG. 7 and described above. FIG. 12 illustrates the ball bearings 236 seated in their rest positions within opposing detents 212 and 224. FIG. 13 illustrates a moved position of the ball bearings 236 along the tracks 214 and 226 in response to turning movements of the vehicle that cause corresponding movements of the interconnected Pitman arm 35, centering shaft 36 and modified rotary plate 222, in the same manner as illustrated for the Pitman arm by the phantom lines 27' and 27" in FIG. 4.

Thus, in FIG. 13, the ball bearings 236 have moved away from the seat bands of detents 212 and 224 and past the ends of their respective ramps, such that the bearings will thereafter move along the static ball track 214 and the rotated dynamic ball track 226 upon further turning movement of the vehicle. As the ball bearings progress up the detent ramps away from their respective seat bands and past the ramp ends, the piston cam plate 210 and its depending lug 213 move from the rest positions shown in FIG. 12 to the depressed positions shown in FIG. 13 wherein lug 213 is near the bottom of bearing jacket 205. The opposite longitudinal ends of ears 207, 207 and of jacket 205 are tapered at 275 and 282, respectively, as shown in FIGS. 12 and 15. The angles of these tapers match the angle of the slope of piston plate surface 279 so that the ends of the ears and the sleeve do not interfere with piston cam plate 210 as it travels into its depressed position.

Figure 14:
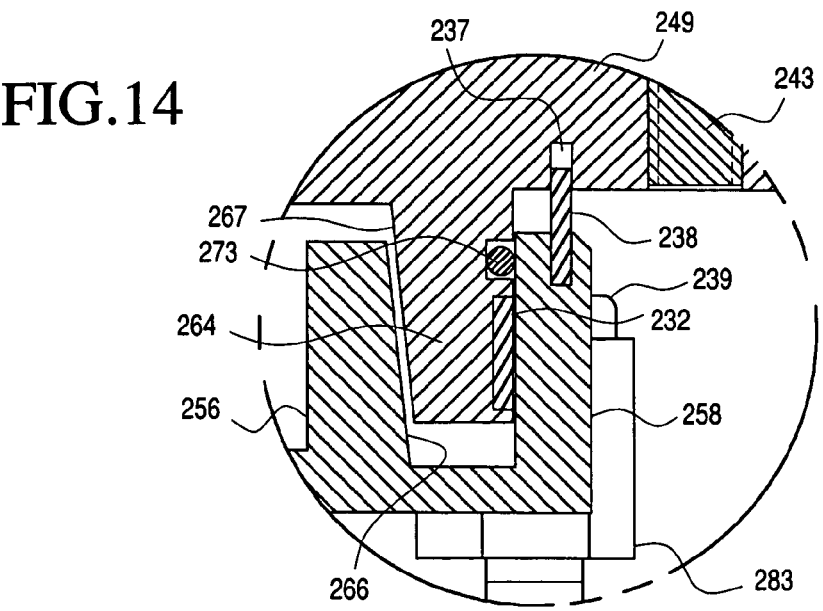
FIG. 14 is an enlarged fragmentary view showing details of the clutch ring face and the opposing clutch disk face within the area identified by the broken line circle 14 in FIG. 13.

FIGS. 13 and 14 also show the clutch disk 249 in its moved position away from clutch ring 256 to release casing 200 for trimming rotation relative to the base member 258, which is fixed permanently to the vehicle frame by a plurality of bolts 239 that pass through a plurality of base lugs 283. The annular clutch ring component 256 is formed by an integral annular ridge upstanding from base member 258. As long as clutch disk 249 remains in frictional engagement with annular clutch ring component 256, both the disk 249 and the piston cam plate 210 are held against rotary movement by means of the engagement between the lug 213 depending from plate 210 and the low friction sleeve 205 held between the two opposing ears 207, 207 upstanding from disk 249. In this embodiment of the invention, the remote trimming feature is provided by mounting the usually static clutch disk 249 for rotation so that its static position relative to the annular clutch ring component 256 may be changed by a trimming device that is actuated from a remote location, such as the driver's station of the vehicle.

To provide the clutch-like mechanism, the entire centering assembly and its casing 200 are carried by the clutch disk 249 and all of these components, including the centering chamber 209, are moveable axially by pressurizing a trim chamber 262 of a trim cylinder formed by an annular outer wall 259 of the base member 258. In this embodiment, disk 249 serves as a trim piston component and has an annular depending ridge 264. The trim chamber 262 is pressurized via a fluid passage 271 and a port 260 in disk 249. Port 260 is preferably connected to the high-pressure air line 42 of FIG. 4. The outer surface of trim piston ridge 264 carries a wear ring 232 of low friction material and an O-ring seal 273. A dust seal ring 238 is fixed to the distal edge portion of trim cylinder wall 259 and reciprocates in an annular groove 237 in an opposing portion of clutch disk 249 as this disk reciprocates axially during trimming adjustments as shown in FIG. 13.

The trim piston portion of the clutch disk described in the two preceding paragraphs functions as a release member that may be driven axially to its release position by fluid pressure, preferably pressurized air, in trim chamber 262. Such axial movement releases the conical clutch disk surface 267 from its frictional engagement with the conical clutch ring surface 266 (FIG. 14) and thereby permits rotation of both disk 249 and piston cam plate 210, as well as the rest of the centering assembly within casing 200. This casing, the centering shaft 36, the rotary cam plate 222 and the rest of the centering assembly within casing 200 also reciprocate axially in the direction of double end arrow R (FIG. 13), along with the clutch disk 249. This axial movement is permitted by arranging for centering shaft 36 to slide back and forth within the coupling sleeve 38, and is guided by splines 33 on the exterior of shaft 36 that mesh with corresponding splines (not shown) on the interior wall of sleeve 38.

Trim chamber pressure acts against a return spring force provided by one or more annular wave springs 244, such as those available from Smalley Steel Ring Company of Wheeling, Ind. This return spring force is produced by an arrangement wherein a depending center post 257 carried by the clutch disk 249 passes through a central aperture 233 of a hollow central pillar 270 of the base member 258. Aperture 233 contains an O-ring fluid seal 273. One or more of the annular wave springs 244 are positioned around the post 257 in the hollow 272 of the pillar 270 and are pressed between a push plate 235 threaded on the distal end of post 257 and an annular thrust bearing 251, which is mounted around the post on the underside of the base pillar 270 within its hollow 272. Thrust bearing 251 is preferable of the needle roller type, such as the thrust needle roller and cage assemblies available from the Torrington Company of Torrington, Conn. The wave springs and the thrust bearings are protected from debris by a dust cover 263, which covers the pillar hollow 272 and is secured by a plurality of screws 231 to the underside of the base 258.

The wall of hollow 272 is stepped to form a stop 278 that is engaged by a perimeter portion of push plate 235 as shown in FIG. 13 to limit its compressive movement, and thereby the axial distance that clutch disk 249 can reciprocate away from clutch ring component 256 during a trimming action. The arc through which disk 249 and casing 200 can rotate relative to the fixed ring 256 during a trimming action is also limited by one or more small lugs 261, 261 that depending from the disk at an intermediate radial position as shown in FIG. 13, and are arranged to travel back and forth within a gap 265 in a distal edge portion of pillar 270. A wall at one end of the gap 265 forms a stop 274 and a wall at the other end of the gap 265 forms a stop 276 as shown in FIG. 15.

With reference particularly to FIGS. 6, 9, 12 and 13, the remotely controlled trim section operates as follows. If there is a roadway pull to the right, straight ahead travel will require a compensating steering force to the left from the steering wheel shaft 30 to move the bearing members 136 or 236 slightly away from their seated positions in opposing detents 112 and 124, or 212 and 224, respectively. Such movement of the bearing members produce a rotary torque on the static cam plate 110 or 210 because of return forces generated by a bias tending to return each of the bearing members to their seats in the detents in response to the fluid pressure in centering chamber 109 or 209. While holding the steering wheel in the position giving straight ahead travel, the trim button 85 is pushed momentarily to briefly open solenoid valve 56 (FIG. 4), which allows fluid to pressurize trim chamber 162 or 262 and thereby disengage clutch disk 149 or 249 from clutch ring 156 or 256, respectively. The respective piston cam plate 110 or 210 then rotates in response to the rotary torque applied thereto to a new center position that returns the ball members 136 or 236 to their fully seated, rest positions in detents 112 and 124 or 212 and 224, and thereby neutralizes the torque.

After its momentary actuation, the trim button 85 is then released to release the trim chamber pressure and thereby lock piston cam plate 110 and clutch disk 149, or piston cam plate 210 and clutch disk 249, in their changed positions corresponding to a new on-center position in which the detent seats are realigned with their corresponding bearing members. This new on-center position will then maintain the vehicle steering system in a newly centered condition, which provides straight ahead travel of the vehicle that is free from the previously experienced roadway pull to the right and will be maintained even when the steering wheel is released. An undesirable steering wheel pull to the left is eliminated in the same way except the rotary torque will be applied in the opposite direction to the piston cam disk 110 or 210, which then will be rotated in the direction opposite from the direction of rotation caused by the above undesirable steering wheel pull to the right.

It is also important to recognize that the centering unit of the present invention engages the vehicle steering system at a location between the steer wheels and the reduction steering gear. As a result, spurious inputs from the steering column 30 and/or from the power steering unit 32 are absorbed by the centering unit 20 or 20' before these inputs can reach the steer wheels. Likewise, spurious forces transmitted from the roadway are immediately absorbed in the centering unit, rather than being transmitted through the entire steering assembly before encountering any stabilizing resistance from the steering wheel. As a result, the centering unit 20 or 20' protects the interior components of the steering assembly from the wear caused by repeated oscillations between states of tension and compression.

The invention may be used with other tie rod arrangements and with steering systems that do not require tie rod arrangements, such as those with only one steerable member, such as the rudder of a ship or an airplane. The variable resistance and return force section of the invention can be used alone as a centering unit without the remote trimming section. On the other hand, the remote trimming section of the invention is useable not only with the centering section disclosed herein, but also in combination with centering mechanisms of the prior art. Thus, the remotely operable trimming section of the present invention can be combined with centering devices of known types to provide adjustment of the center position during vehicle operation. Also, one or more of the resistance components or remote trimming components of the present invention may be combined with one or more such components as disclosed in my prior U.S. Pat. Nos. 4,410,193; 4,418,931; 4,534,577; 5,527,053;

5,536,028; 6,003,887; 6,267,395; 6,422,582; 6,520,519; 6,520,520; and 6,530,585, the entire contents of each of these patents being expressly incorporated herein by reference. In addition, a number of other modifications to both the variable resistance components and to the trimming components specifically disclosed herein are possible without departing from the scope of the invention as defined by the claims set forth below.

What is claimed is:

1. A steering control apparatus for a steering system of a vehicle having at least one steerable member movable in response to a steering force to either side of a selected center position relative to carrying means for carrying the steerable member, said apparatus comprising:
   a rotary cam member mounted for rotation about an axis and having a corresponding face with at least one centering detent;
   a piston cam member having a corresponding face arranged opposite to the rotary member face with a centering detent aligned with each rotary member detent when the rotary cam member is in a centered position corresponding to the selected center position of the steerable member, each of the piston member and rotary member detents comprising a seat;
   a bearing member arranged to be pressed between the rotary and piston cam members and to be in a seated position in contact with the seats of the aligned centering detents when the steerable member is in the selected center position;
   rotation means for rotating the rotary cam member relative to the piston cam member in response to movement of the steerable member away from the selected center position;
   pressing means for pressing together the piston and rotary cam members so that contact pressure between the bearing member and the seats of the aligned centering detents causes a resistance force that resists relative movement between the rotary cam member and the piston cam member and prevents substantial movement of the steerable member away from the selected center position until the steering force exceeds a predetermined value; and,
   trim means for changing a center position of said piston cam member so as to selectively vary said selected position of said steerable member while said vehicle is in operation, said trim means comprising:
   a clutch ring mounted in a fixed position relative to the carrying means and a clutch disk arranged for releasably engaging the clutch ring,
   connecting means for connecting the piston cam member for rotation with the clutch disk while permitting relative axial movement between the piston cam member and the clutch disk,
   positioning means for momentarily releasing said clutch disk from engagement with said clutch ring in response to at least one remote input, said clutch disk when released being rotatable with said piston cam member in response to movement of said bearing member by rotation of said rotary cam member such that the center position of said piston cam member can be changed between a plurality of static rotational positions relative to the carrying means,
   and control means for selectively providing said at least one remote input to said positioning means from a location remote to said clutch disk and piston cam member.

2. The apparatus of claim 1, wherein said connecting means comprises at least one guide member fixed to one of said piston cam member and said clutch disk and extending into and arranged for sliding movement within a corresponding guiding receptacle of the other of said piston cam member and said clutch disk, said guide member movement guiding axial movement of said piston cam member relative to said clutch disk in response to movement of said bearing member away from said detent seats.

3. The apparatus of claim 2, wherein said guide member comprises at least one guide pin fixed to one of said piston cam member and said clutch disk and extending into and arranged for sliding movement within a corresponding bore of the other of said piston cam member and said clutch disk, said sliding pin movement guiding axial movement of said piston cam member relative to said clutch disk in response to movement of said bearing member away from said detent seats and also axial movement of said clutch disk relative to said piston cam member when said clutch disk is released from engagement with said clutch ring in response to said remote input.

4. The apparatus of claim 2, wherein said guide member comprises at least one guide lug fixed to one of said piston cam member and said clutch disk and extending into and arranged for sliding movement within a corresponding receptacle of the other of said piston cam member and said clutch disk, said receptacle having opposing sides formed by opposing ears upstanding from said other of said piston cam member and said clutch disk, and said opposing receptacle sides guiding said sliding lug movement and axial movement of said piston cam member relative to said clutch disk in response to movement of said bearing member away from said detent seats.

5. The apparatus of claim 1, wherein said positioning means comprises actuating means and bearing means for rotatably mounting said clutch disk on a support member of said actuating means, said actuating means being responsive to said remote input for causing said clutch disk to reciprocate between a released position at which said clutch disk is released from engagement with said clutch ring and an engaged position at which said clutch disk is frictionally engaged by said clutch ring.

6. The apparatus of claim 5, wherein said actuating means comprises a trim piston arranged for axial reciprocation within a trim chamber pressurizable by introduction of a fluid therein in response to said remote input, and engaging means for causing said clutch disk reciprocation in response to reciprocation of said trim piston.

7. The apparatus of claim 6, wherein said bearing means is carried by the support member of said actuating means, and wherein said engaging means comprises at least one elongated trim bar arranged for pivotal movement in a longitudinal plane of the bar for causing axial movement of the support member in response to said axial reciprocation of the trim piston, said trim bar having a proximate end mounted on said trim piston for said pivotal movement and an elbow adjacent a distal end arranged to function as a fulcrum for said pivotal movement.

8. The apparatus of claim 6, wherein said bearing means is carried on the support member of said actuating means, wherein said support member and said trim piston are arranged for axial movement relative to each other, and wherein said positioning means further comprises at least one guide post fixed within a corresponding bore of one of said trim piston and said support member and extending into and arranged for sliding movement within a corresponding bore of the other of said trim piston and said support member, said sliding post movement guiding said relative axial movement between said support member and said trim piston.

9. The apparatus of claim 5, wherein said bearing means is carried on the support member of said actuating means, wherein said support member and said clutch disk are arranged for axial movement relative to each other, wherein said positioning means further comprises a guide post fixed to said clutch disk and extending into and arranged for sliding movement within a corresponding bore of said support member, said sliding guide post movement guiding said relative axial movement between said support member and said clutch disk, and wherein said apparatus further comprises casing means for holding said clutch disk at a fixed axial position relative to said rotary cam member.

10. The apparatus of claim 9, wherein pressurization of said trim chamber causes said clutch disk to move to its release position, and wherein said apparatus further comprises trim spring means engaged between said guide post and said support member for returning said moved clutch disk to its engaged position with said clutch ring when said trim chamber is depressurized.

11. The apparatus of claim 1, wherein each of the piston member and rotary member detents comprise opposing ramps one on each side of the respective detent seat and each inclined away from the respective seat up toward said corresponding faces, wherein relative movement between the rotary cam member and the piston cam member causes said bearing member to move up one or the other of said opposing detent ramps, and wherein said pressing means provides contact pressure between said ramps and said moved bearing member for causing a return force resisting up ramp movement of said bearing member and biasing said moved bearing member toward said seated position.

12. The apparatus of claim 11, wherein each of said ramps is formed with a groove having substantially the same radius as the bearing member to provide a snug fit and firm frictional engagement for driving the bearing member out of the seats and up along the ramps upon rotation of the rotary cam member.

13. The apparatus of claim 12, wherein each of said ramps is fared into a corresponding track for receiving the bearing member upon movement thereof away from a corresponding detent.

14. The apparatus of claim 13, wherein each of the tracks is formed by a groove having substantially the same radius as the bearing member.

15. The apparatus of claim 1, wherein said pressing means comprises adjusting means operable for varying the contact pressure between the bearing member and the aligned detents so as to vary the amount of steering force required for movement of the steerable member away from the selected center position, and control means for remotely operating the adjusting means so as to selectively vary the amount of the contact pressure while the vehicle is in operation.

16. The apparatus of claim 15, wherein said pressing means further comprises pressurizing means for providing a pressurized fluid in a centering chamber for biasing the piston cam member toward the rotary cam member, and wherein said adjusting means comprises means for varying the pressure of the fluid in said centering chamber to change the amount of contact pressure provided against the bearing member by the rotary and piston cam members.

17. The apparatus of claim 1, wherein said pressing means comprises pressurizing means for providing a pressurized fluid in a centering chamber for biasing the piston cam member toward the rotary cam member, and biasing means for biasing the piston cam member toward the rotary cam member so that contact pressure between the bearing member and the aligned detents is maintained in the absence of fluid pressure in said centering chamber.

18. The apparatus of claim 17, wherein said centering chamber and said biasing means are arranged so that fluid pressure in said centering chamber and a spring force of said biasing means also biases said released clutch disk into frictional engagement with said clutch ring in the absence of said remote input.

19. The apparatus of claim 1 comprising a plurality of bearing members, and wherein the rotary and piston cam members each have a plurality of centering detents one for receiving each of the plurality of bearing members.

20. The apparatus of claim 1 comprising a plurality of bearing members arranged in spaced relation to each other, and retaining means for retaining the bearing members in said spaced relation, the rotary and piston cam members each having a plurality of centering detents one for receiving each of the bearing members, and said centering detents having a spaced relation corresponding to the spaced relation of the bearing members.

21. An apparatus according to claim 1, wherein said pressing means comprises said piston cam member arranged for reciprocation in a centering chamber for applying a resilient force against said bearing member, and pressurizing means for providing a pressurized fluid in said centering chamber so that fluid pressure causes said piston cam member to apply said resilient force and thereby provides said resistance force by causing said bearing member to oppose movement of said steerable member toward either side of said selected position; and wherein each of said centering detents further comprises opposing ramps arranged on opposite sides of the respective detent seat to receive said bearing member when said piston and rotary cam members move relative to each other, said ramps being shaped so that said fluid pressure causes said bearing member to provide a return force biasing said steerable member toward said selected position during at least part of the movement of said steerable member to either side of said selected position.

22. The apparatus of claim 21, wherein each of said opposing ramps is fared into a corresponding track for receiving the bearing member upon movement thereof away from a corresponding detent, and wherein said opposing ramps are shaped so that said fluid pressure causes said bearing member to provide a return force biasing said steerable member toward said selected position during at least a range of the movements of said steerable member to either side of said selected position.

23. An apparatus according to claim 21, wherein said pressurizing means comprises a source of pressurized gas and means for supplying said pressurized gas as the fluid in said centering chamber, and control means for adjusting the amount of gas pressure in said centering chamber to vary said resistance and return forces.

24. A steering control apparatus for a steering system of a vehicle having at least one steerable member movable to either side of a selected center position relative to carrying means for carrying the steerable member, said apparatus comprising:
   a rotary cam member mounted for rotation about an axis and having a corresponding face with at least one centering detent;
   a piston cam member having a corresponding face arranged opposite to the rotary member face with a centering detent aligned with each rotary member detent when the rotary cam member and the piston cam member are in centered positions corresponding to the selected center position of the steerable member, each of the piston member and rotary member detents comprising a seat;

a bearing member arranged to be pressed between the rotary and piston cam members and to be in a seated position in contact with the seats of the aligned centering detents when the steerable member is in the selected center position;

rotation means for rotating the rotary cam member relative to the piston cam member in response to movement of the steerable member away from the selected center position;

pressing means for pressing together the piston and rotary cam members so that contact pressure between said seated bearing member and the seats of the aligned centering detents causes a resistance force that resists relative movement between the rotary cam member and the piston cam member and prevents substantial movement of the steerable member away from the selected center position until a steering force exceeds a predetermined value; and, guide means for preventing rotation of the piston member while guiding reciprocation of the piston member toward and away from the rotary member in response to movement of the bearing member away from said detent seats.

25. The apparatus of claim 24 further comprising trim means for remotely changing the centered positions of said rotary and piston cam members so as to selectively vary said selected position of the steerable member while said vehicle is in operation.

26. The apparatus of claim 25, wherein said trim means comprises:

a clutch ring mounted in a fixed position relative to the carrying means and a clutch disk arranged for releasably engaging the clutch ring, said guide means connecting the piston cam member for rotation with the clutch disk while permitting relative axial movement between the piston cam member and the clutch disk, positioning means for momentarily releasing said clutch disk from engagement with said clutch ring in response to at least one remote input, said clutch disk when released being rotatable with said piston cam member in response to movement of said bearing member by rotation of said rotary cam member such that the centered positions of said rotary and piston cam members can be changed between a plurality of static rotational positions relative to the carrying means, and control means for selectively providing said at least one remote input to said positioning means from a location remote to said clutch disk and piston cam member.

27. The apparatus of claim 24 further comprising a support member, and wherein the guide means comprises a pair of spaced apart ears mounted on one of the piston member and the support member to provide a channel, and a lug mounted on the other of the piston member and the support member and arranged for reciprocation between and in sliding engagement with guiding surfaces in said channel.

28. The apparatus of claim 24 further comprising a support member, and wherein the guide means comprises at least one bore in one of the piston member and the support member, and at least one pin mounted on the other of the piston member and the support member and arranged for reciprocation within and in sliding engagement with a guiding surface in said at least one bore.

29. The apparatus of claim 24, wherein each of the piston member and rotary member detents comprise opposing ramps one on each side of the respective detent seat and each inclined away from the respective seat outward toward said corresponding faces, wherein relative movement between the rotary cam member and the piston cam member causes said seated bearing member to move outward along one or the other of said opposing detent ramps, wherein said pressing means provides contact pressure between said ramps and said moved bearing member for causing a return force resisting up ramp movement of said bearing member and biasing said moved bearing member toward said seated position, and wherein each of said ramps is formed with a groove having substantially the same radius as the bearing member to provide a snug fit and firm frictional engagement for driving said seated bearing member out of the seat and up along the ramps upon rotation of the rotary cam member.

* * * * *